United States Patent
Patwardhan et al.

(10) Patent No.: US 9,846,496 B2
(45) Date of Patent: Dec. 19, 2017

(54) VIRTUAL INPUT DEVICE SYSTEM

(71) Applicant: Home Box Office, Inc., New York, NY (US)

(72) Inventors: Makarand V. Patwardhan, Redmond, WA (US); J. Jordan C. Parker, Seattle, WA (US); Nathan J. E. Furtwangler, Kirkland, WA (US); Jesse Corrington, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 37 days.

(21) Appl. No.: 14/843,882

(22) Filed: Sep. 2, 2015

(65) Prior Publication Data
US 2016/0070365 A1   Mar. 10, 2016

Related U.S. Application Data

(60) Provisional application No. 62/046,122, filed on Sep. 4, 2014, provisional application No. 62/046,132, filed on Sep. 4, 2014.

(51) Int. Cl.
*G06F 3/038* (2013.01)
*G06F 3/0487* (2013.01)
(Continued)

(52) U.S. Cl.
CPC ............ *G06F 3/038* (2013.01); *G06F 3/0482* (2013.01); *G06F 3/0487* (2013.01); *G06F 3/04812* (2013.01); *G06F 3/04842* (2013.01); *G06F 9/4443* (2013.01); *G06F 11/3664* (2013.01); *G06F 11/3688* (2013.01)

(58) Field of Classification Search
USPC ........................ 345/156, 168; 703/21, 24, 25
See application file for complete search history.

(56) References Cited

U.S. PATENT DOCUMENTS

| 5,801,696 A | 9/1998 | Roberts |
| 5,878,113 A * | 3/1999 | Bhusri ................ H04M 3/2254 379/111 |

(Continued)

OTHER PUBLICATIONS

"International Search Report and Written opinion from International Patent Application Serial No. PCT/US15/48398, dated Nov. 27, 2015, 13 pages."

(Continued)

*Primary Examiner* — Carolyn R Edwards
*Assistant Examiner* — Deeprose Subedi
(74) *Attorney, Agent, or Firm* — Amin, Turocy & Watson, LLP

(57) ABSTRACT

The described technology is directed towards virtual input devices that take application program-directed input from automation and/or remote devices, such as over a network, instead of via actual user input via a physical device, for example. This allows an automation framework to insert input into an application program, such as for automated testing without modifying any of the application's other components. The virtual input devices may be object instances or the like that receive their input from function calls based upon the type of input and output events, e.g., to simulate keyboard input/output (I/O), mouse or other pointer I/O, voice, gesture, and other command I/O, and so forth.

20 Claims, 15 Drawing Sheets

(51) Int. Cl.
*G06F 3/0482* (2013.01)
*G06F 3/0481* (2013.01)
*G06F 3/0484* (2013.01)
*G06F 11/36* (2006.01)
*G06F 9/44* (2006.01)

(56) References Cited

U.S. PATENT DOCUMENTS

| | | | |
|---|---|---|---|
| 6,463,581 B1 * | 10/2002 | Bacon | G06F 8/4434 |
| | | | 712/E9.085 |
| 7,451,455 B1 | 11/2008 | El-Haj | |
| 2006/0209016 A1 * | 9/2006 | Fox | G06F 3/038 |
| | | | 345/156 |
| 2007/0288937 A1 | 12/2007 | Durojaiye et al. | |
| 2008/0082991 A1 | 4/2008 | Fairs et al. | |
| 2012/0265516 A1 * | 10/2012 | Ark | G06F 11/3051 |
| | | | 703/21 |
| 2014/0075458 A1 | 3/2014 | Wright et al. | |
| 2015/0039285 A1 * | 2/2015 | Qian | G06Q 30/00 |
| | | | 703/21 |

OTHER PUBLICATIONS

Thomas Ostrand, et al: "A Visual Test Development Environment for Gui Systems," Mar. 1, 1998, 12 pages.

\* cited by examiner

VIRTUAL INPUT DEVICE SYSTEM

CROSS-REFERENCE TO RELATED APPLICATION

The present application claims priority to U.S. provisional patent application Ser. Nos. 62/046,122 and 62/046,132, filed Sep. 4, 2014. The entireties of each are incorporated herein by reference.

BACKGROUND

In contemporary computer programs, there are often several ways for a user to interact with a program's user interface, including gamepad input (e.g., pressing the 'A' button on a game controller), keyboard (e.g., QWERTY) input, and media remote input (e.g., pressing a semantic button on a media remote control device, like the "Fast Forward" button). Other typical ways to interact include touch input (e.g., by pressing an on-screen button with a finger, or indirectly with a gesture-detecting/tracking device such as Kinect®), or to interact via mouse or other pointer input (e.g., clicking on a UI element with a mouse). Another interactive technique is voice/speech input, such as saying the word represented by text on a button while in a voice input mode, (e.g., "Play").

The many varied types of input, when considered in combination with the many types of UI elements, can be confusing and time-consuming for a UI designer to handle correctly. Moreover, testing and troubleshooting may be difficult given the various types of input devices, each of which may have its own nuances.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards virtual input devices that simulate events corresponding to user interaction via actual input devices. One or more aspects are directed towards receiving a request to output an event at a virtual input device, and outputting data directed to a computer program from the virtual input device to simulate the event being output from an actual input device.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

Figure 1:
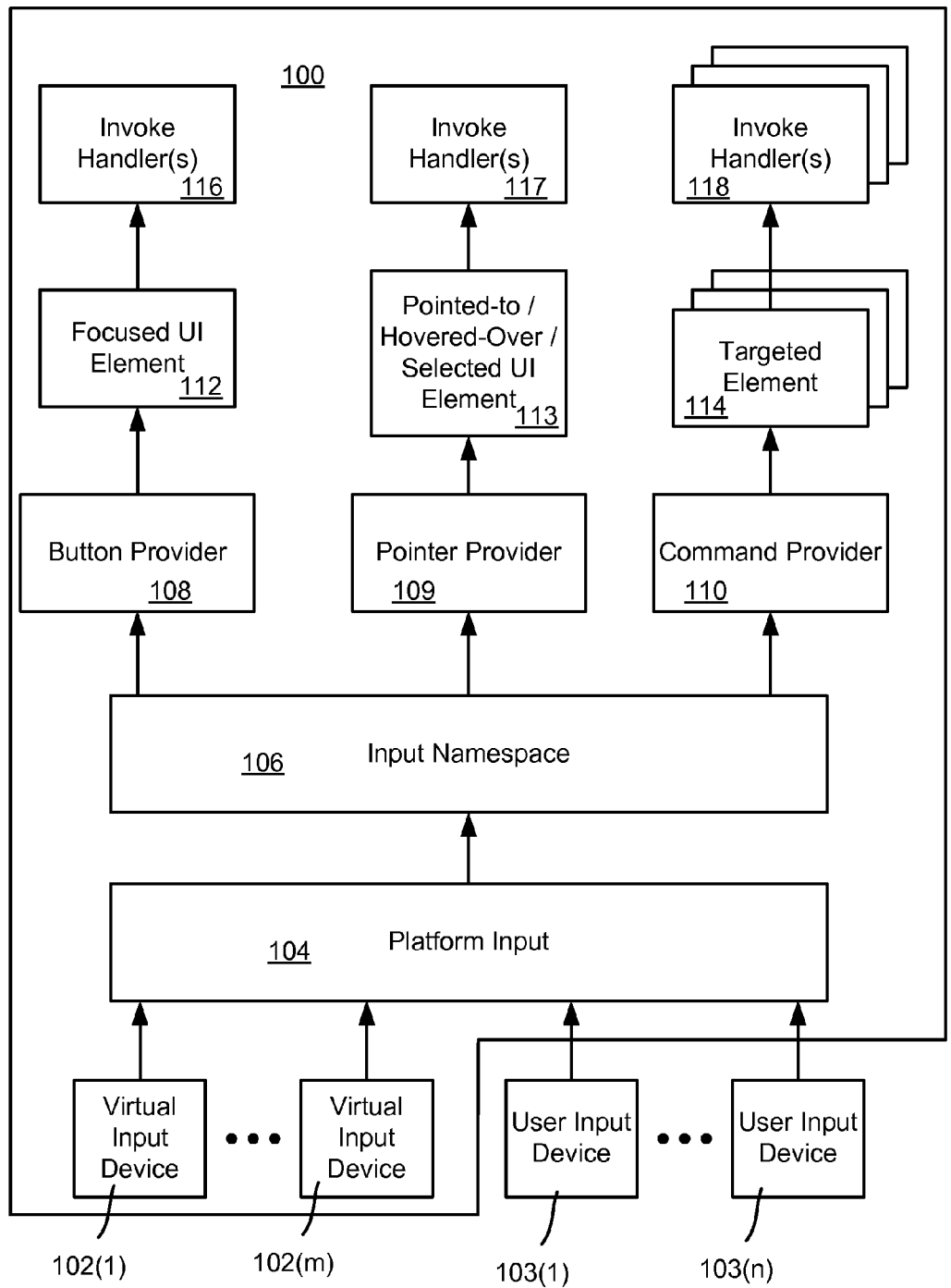
FIG. 1 is a block diagram showing an example configuration of components including virtual input devices for sending simulated device input/output (I/O) events to a user interface (UI) element or elements, according to one or more example implementations.

The technology described herein is directed towards virtual input devices that may be coupled to provide input to a computing machine/device and an application program running thereon, as if those devices were actual input devices. This allows for automated testing, troubleshooting, providing user support and so on, including remote (e.g., networked) operations.

For example, a UI element of program code (e.g., an application) such as a button in a menu can be "invoked" to trigger navigation to a new location in the application. Such a button may be triggered in various ways, including by virtual button input, physical or touch-screen keyboard input, mouse input, touch input and in other ways, e.g., a "Home" command may result in navigation to a home location, regardless of the source of the command. The normalization via the providers abstracts the program code from having to deal with many different types of devices, and indeed, can abstract the program code from knowing whether input is being received from an actual user input device or a (possibly remote) virtual input device, or some combination thereof.

The technology described herein thus sends virtual input data to a system that manages the handling of various input in a unified way that simulates user (e.g., an actual user or a tester) intent (to a very high likelihood) or automated entity's intent with respect to UI element interaction. As a result, the input that generates an invoke action (e.g., the above described navigation) may be input to the application program code and the application program code's UI by virtual devices.

It should be understood that any of the examples herein are non-limiting. For instance, although certain types of input devices are exemplified herein, the technology is able to work with other types of input devices, including devices that track eye gaze, sense brainwaves, combine device input (e.g., a voice command interpreted one way based upon a concurrent gesture and another way if the gesture is different), and so on, including future types of devices not yet implemented. As another example, exemplified herein are different states of a user interface element such as focused and hovered, however other states such as selected, pressed, listening for audio or gesture input and so forth may exist with respect to a user interface element, and thus may be used by the technology described herein. Still further, actual user input, whether local and/or remote, may be used in conjunction with virtual (e.g., simulated) input, such as for refining or extending an otherwise automated test, allowing a user to confidentially enter credentials that a test needs to operate and so on. As such, the technology described herein is not limited to any particular embodiments, aspects, concepts, structures, functionalities or examples described herein. Rather, any of the embodiments, aspects, concepts, structures, functionalities or examples described herein are non-limiting, and the present technology may be used in various ways that provide benefits and advantages in computing, device input and user interface technology in general.

It is often desirable for an application program architecture to not target a particular hardware platform, as much of the application program may be reused on different platforms. To this end, platform-dependent components are abstracted from and independent of other components in the architecture. This allows the application to be adapted to various hardware platforms by plugging-in only the platform-dependent components for each given platform, which does not affect other platform-independent components.

Notwithstanding, input devices and their implementations vary widely from platform to platform. To abstract away platform-specific details about input devices, and to provide a richer user and development experience, described herein is a technology directed towards virtual input devices.

To simplify and abstract physical input devices from a computer program, described herein is a unified way to handle input and take appropriate invoke actions based upon the input without the UI element necessarily being aware of the source of the input. As one example, if the user types a particular keyboard key, the application code (e.g., a focused UI element therein) receives a button event from a button provider with the corresponding key code regardless of whether the "typing" was via a physical keyboard, a touch-screen keyboard, a device that converts handwritten symbols to keyboard characters, and so on.

In general, the technology is based upon a unified way to handling the "invoke" intent of input to program code, e.g., input directed to a given element of a user interface (UI);

note that as used herein, "UI element" may corresponding to any portion of program code with which a user interacts, including but not limited to views, UI object elements such as containers, buttons, tiles, text entry areas, speech input areas, areas for image data, a program window, and so forth.

In one aspect, the virtual input devices are each mapped to one of a limited number of providers so as to normalize the input from the perspective of the program code to only certain types of input devices. For example, virtual input devices may be classified as being button devices, pointer devices or command devices which map to a button provider, pointer provider or command provider, respectively.

The following table shows a few non-limiting examples of mapping physical devices (including touch-screen type devices not always considered physical) to their virtual counterparts and corresponding providers

| Physical device | Maps to Virtual Device(s)/Providers |
| --- | --- |
| Keyboard | Virtual button device - Most keyboard keys are exposed as button input via the button provider. |
| | Virtual command device - Some keyboard keys are exposed as commands (such as play, pause, mute and so on) via the button provider |
| Gamepad | Virtual button device - Both digital and analog buttons/triggers are exposed as button input via the button provider. |
| Rock Band ® Guitar | Virtual button device/button provider |
| Mouse | Virtual pointer device/pointer provider |
| Stylus | Virtual pointer device/pointer provider |
| Touch | Virtual pointer device/pointer provider |
| PlayStation ® Move (pointing device) | Virtual pointer device/pointer provider |
| PlayStation ® Eye (camera) | Virtual pointer device/pointer provider |
| Voice | Virtual command device/command provider |
| Media Remote | Virtual command device/command provider |

FIG. 1 is a block diagram showing various example components directed towards handling input and invoke in a unified way. In general, a computing machine/device 100 has one or more virtual input devices 102(1)-102(m) coupled thereto to allow a user to interact with the computing machine/device 100. The virtual input devices 102(1)-102(m) provide virtual input data as if they were real input devices, and indeed, the virtual input data may be manually generated by a tester or the like using actual input devices. Computer generated virtual input data may be used in addition to or instead of manually generated virtual input data.

The computing machine/device 100 also may have user input devices 103(1)-103(n) coupled thereto. Depending on the type of computing machine/device 100, various non-limiting input devices include a physical and/or touch-screen keyboard, game controller, remote controller (e.g., for an interactive television), touch-screen, mouse or other pointer (including finger touch, trackball, joystick, etc.) input, gesture detection devices, speech detection devices and so on. As is understood, in a given scenario, not all such exemplified input devices are likely in use, and one or more other input devices may be present. Also note that an input device may be externally coupled to the computing machine/device 100, e.g., a remote controller or a camera, or internally coupled to (other components of) the computing machine/device 100, e.g., a touch-sensitive screen of a tablet device or smartphone, a built-in microphone and so on.

In general, the input is received at a given platform, and the platform may handle some of the platform input 104 at the platform level, e.g., to switch among application programs, perform platform-directed commands (shut off the computing device) and so on. In typical scenarios, however, much of the input is routed to an active (e.g., focused) application program or the like to allow user interaction with the application program's currently displayed user interface (UI) elements. Example program input includes sending input commands and/or data to a focused UI element, changing focus between UI elements, scrolling UI elements into and out of view, hovering a mouse pointer over different UI elements and so on.

As described herein, an input namespace component 106 may be used to map input from different input device sources to one of a limited number of providers, generally based upon the type of input. Three such providers are exemplified in FIG. 1, namely a button provider 108, a pointer provider 109 and a command provider 110. Note that the "providers" comprise an input normalization mechanism and corresponding logic, and thus may be part of a larger entity, e.g., a single object or the like may receive input and classify it as a button event, pointer event or command event and include logic for dealing with each type of event with respect to one or more UI elements.

It should be noted that a computing machine may be coupled to a virtual input device that is not directly supported by the computing machine/device 100. For example, consider a device that does not have a touch-sensitive screen, such as a personal computer with a conventional display-only monitor. A tester can enter data via a touch-sensitive screen using a finger or stylus to provide virtual pointer data to the application program; because the program code (e.g., its currently pointed-to or hovered over UI element) only receives pointer events and accompanying data via the pointer provider, the program code operates as if a mouse, which is supported, was used to generate the pointer events, for example. Indeed, in real time, even if there is no device driver and so on for a particular device, a user may use such an unsupported device to send virtual input data to a program element running on another device, e.g., via a wired (e.g., USB or LAN) connection, Wi-Fi, Bluetooth®, infrared and so on, and thereby have the program element execute an invoke action as if directly coupled and supported.

With respect to unified input and invoke handling, it is desirable to be able to describe what happens when a piece of UI is invoked, independent of how it was invoked. This is useful for many reasons, including that the system can describe the invoke intent once, instead of many times, and allow an upstream input system to determine whether that invocation should occur, (e.g., factoring in platform-independent and platform-dependent input devices). This also normalizes input concepts to a limited number of (e.g., three) types, exemplified herein as Button, Pointer and Command types, despite differences among actual input devices. Among other benefits, this makes the input handling system extensible as new devices are invented or added to a platform. This further enables remapping of device types based on user intent, whereby, for example, a keyboard can act as a gamepad in a way that is transparent to the application program UI.

To accomplish unified input and invoke handling across devices and platforms, described herein is an input provider system for normalizing virtual and physical device input, in conjunction with a unified concept of invoke handlers to allow the declaration of invocation actions for the various types of input.

In one or more implementations, button provider input is routed to the single focused UI element 112, expecting that the element may have an appropriate button invoke handler, while command provider input is routed to all visible elements 114 that match a given command (not any off-screen elements). Pointer provider input targets the UI element currently under the pointer device's logical cursor, referred to herein as the pointed-to, hovered over and/or selected UI element 113.

Note that UI elements are arranged in a UI tree, e.g., from a highest-level parent (e.g., a menu) to its children (e.g., sub-menus), which are parents to its own children (e.g., selectable items) and so on. When an invoke action does occur on a UI Element, the invoke action is performed by the corresponding invoke handler or handlers for each invoked UI element. In the event that the invoke is not handled by a UI element, e.g., because the element does not have a suitable invoke handler for the invoke event, the invoke bubbles up the UI tree, allowing its parent element in the ancestor chain to handle the event that was not handled lower in the tree. For example, with button provider input, the input bubbles up the focus train in the tree (e.g., the focus chain 444, FIG. 4) until handled.

Figure 2:
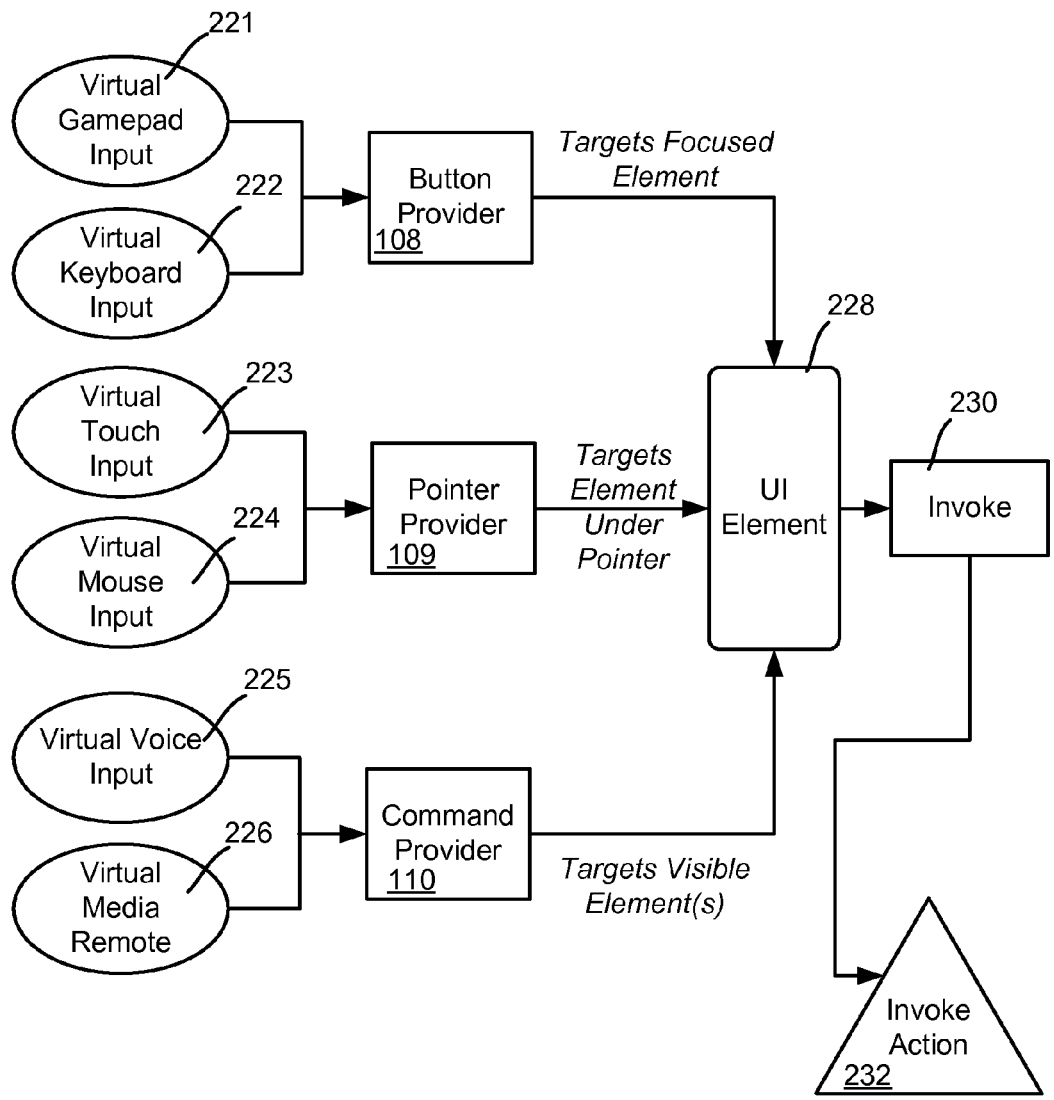
FIG. 2 is a representation of some example types of virtual input devices normalized/classified into different types of providers, according to one or more example implementations.

A given UI element may have one or more invoke handlers associated with that element. An invoke handler 116-118 or may have properties including button, pointer, command text and invoke actions. As shown in FIG. 2, various example types of input 221-226 are associated with one (or more) of the providers 108-110 as described herein which provides events to a UI element 228 based upon the type of provider and various states of the UI element, e.g., focused, under the pointer, or targeted by a command.

For example, button is a property corresponding to the semantic button that triggers an invoke 230 associated with the UI element, as provided by a button provider 108 event. Alternatively, a pointer event may trigger the invoke 230 as provided by a pointer provider 109 event, or command text may be the semantic command text that triggers the invoke 230, as provided by a command provider 110 event. Invoke action 232 describes the action to take when the appropriate button, command, or pointer event fires on the UI element. Note that the system is flexible, such that different invoke handlers and/or actions may be used, which may be per UI element, and even per-button, per-pointer and per-command. For example, a button to a text entry element may have an invoke action that sends alphanumeric characters, cursor keys, backspace and delete keys to the text entry field, however an "Enter" character may take an entirely different action. A key combination such as Alt-W may trigger an invoke action for one UI element that is entirely different from the invoke action for another UI element, and so on.

The platform input 104 and input namespace 106 are responsible for providing low level input mechanisms to the platform. As an abstraction on top of various platforms' input, the input mechanisms are generalized to categories of input. For example keyboard, gamepad, and some media remote input is generally considered 'button' input that is processed by the button provider 108. Mouse, touch, stylus, and skeletal input are each generally considered 'pointer' input that is processed by the pointer provider 109. And voice input, certain keyboard (e.g., Ctrl+S), and some media remote commands are considered 'command' input that is processed by command button provider 110.

Each abstract category of input is considered/corresponds to an input provider, which adapts client input devices (e.g., keyboard 222) into an appropriate input provider (e.g., button provider 108). When multiple client input devices are available for the same input provider, the input provider may aggregate the input devices into a single facade. Similarly, some client input devices may span multiple input providers. For example, some advanced keyboards may be exposed via button provider and command provider, as certain keys correspond to commands rather than buttons.

Figure 3:
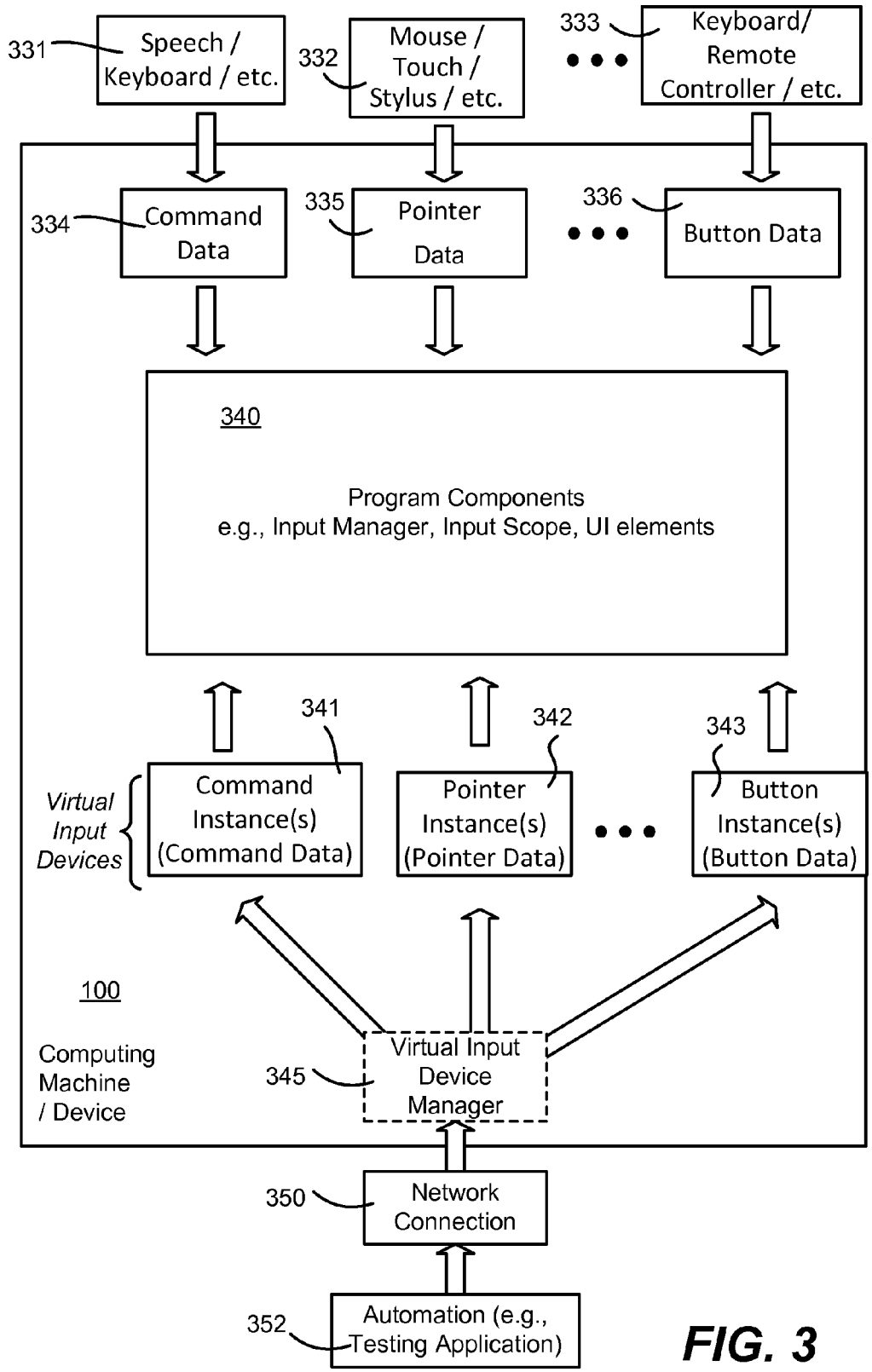
FIG. 3 is a block diagram showing an example configuration of components including virtual input devices and actual (e.g., physical) input devices coupled to program components, according to one or more example implementations.

As represented in FIG. 3, example input devices may include one or more pointer devices 332. This device type uses hit-testing to provide input (pointer data 335) that is directed to the user interface (UI) element "under" the pointer. A button device 333 is a device type that provides input (button data 336) that is directed to the UI element that has "focus". A command device 331 is a device type that provides command input data 334 that is directed towards a UI element on the screen, but not through the use of hit-testing or focus. Examples include a speech recognizer, a gesture detector, certain keys of a keyboard, and so forth. Other input devices are contemplated, including those that input speech, gestures, eye gaze, skeletal data and so forth.

These and other well-defined device types provide a consistent input interface that other platform components can depend on and act on. When adapting an application to a new hardware platform, the developer can map the available hardware input devices onto one or more of these types, without affecting other components 340 of the application program. As described herein, differences between the virtual input devices are based on how each type of input is intended to be used (invoke intent), how input events are organized and exposed, and what data each input event contains.

In addition to mapping physical devices to one of the types of input devices, the platform also may create instances of such devices that are not backed by physical hardware, (possibly remotely, but at least not directly). These instances are referred to as "virtual input devices" and may, for example, be object instances. There may be one or more command instances 341 that provide command data, one or more pointer instances 341 that provide pointer data, and one or more button instances 341 that provide button data. Each instance may simulate a particular physical device, e.g., there may be a keyboard instance and a game controller instance that each provides button-related data to a button provider, e.g., the same data as if an actual keyboard and actual game controller were providing the data. Such simulated data may be used to test the provider code/logic itself.

In an alternative implementation, a virtual input device may output "provider" data, e.g., directly to a UI element, (possibly in addition to simulating actual device data). Having a virtual input device (or a different type of virtual input device) that is able to sometimes bypass the provider and sometimes go through the provider may allow certain scenarios to be tested that are not otherwise easily tested. Note that the input device whether virtual or actual that was used to provide input is mostly internally processed by the appropriate input provider, but there are times where the application program may access this information. Although in many instances the application program code does not care about the specific input device, if the application program code does care, the invoke handlers are able to process the input provider event arguments to determine the specific source of input. For example, if desired, a game application program may differentiate between a keyboard and gamepad controller, even though both correspond to a button provider, such as to make game play be more consistent between devices (e.g., if one device makes possible faster user input than the other). Such code may be tested with and without the actual provider involved, to determine if the provider or the invoke handler, for example, is causing a bug.

In one or more implementations, the virtual devices are controlled by input taken from a network over a network connection 350, although local virtual input is feasible. This allows an automation framework 352 to insert input into the application, such as to allow the application to be automated easily for testing, troubleshooting and/or providing user help-related actions without modifying any of the application's other components.

Also shown in FIG. 3 is a virtual input device manager 345, which may be optional (or handled by the program code) at least to an extent. For example, if the virtual input devices are objects, they may only be instantiated if needed, e.g., as requested by automation 352 or some other entity. The virtual input device manager 345 may handle this instantiation. Further, the virtual input device manager 345 may direct instructions and data to the appropriate virtual input device, e.g., a test may specify to "click" on a particular UI element and thereby give that element focus, followed by "typing" a set of keystrokes (as button data) to that focused UI element. Such a test may specify that a mouse virtual input device be used, and provide a location to move the mouse pointer and the click instruction. Once focused, the test may further specify that a keyboard virtual input device be used to send the keystrokes. The virtual input device manager 345 may call one or more appropriate functions (methods) on the appropriate virtual input device functions to make this happen without the automation having to know the details of each virtual input device object. The virtual input device manager 345 also may be instructed to perform some timing-related actions, e.g., send the keystrokes at a "typical user" rate to the focused UI element rather than as fast as possible.

Turning to virtual input devices and corresponding input providers, a general difference between input providers is based on how each type of input is intended to be used, how input events are organized/exposed, and what data each input event contains. The following are only some non-limiting examples, and not all need be used in a given implementation.

Figure 4:
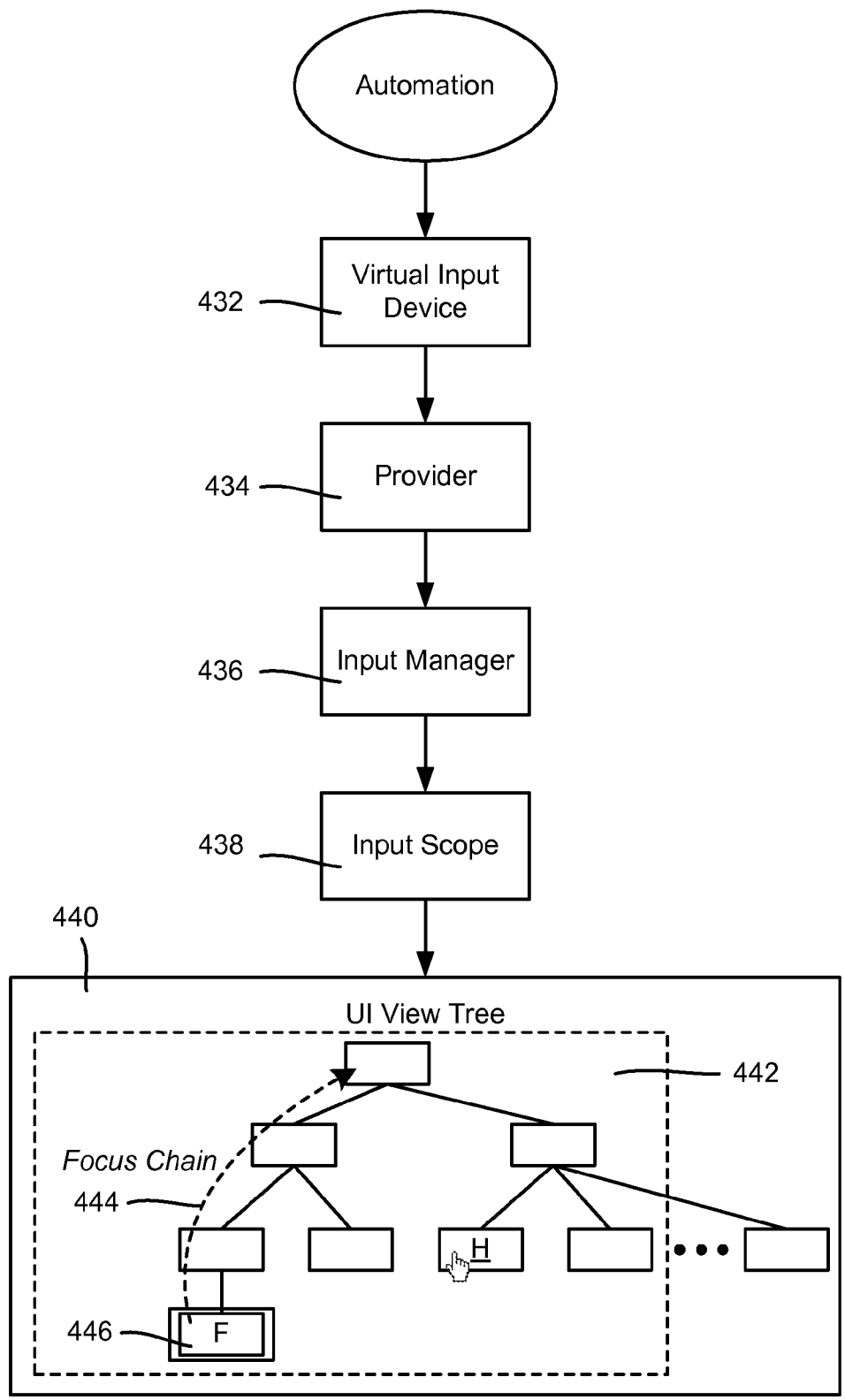
FIG. 4 is a block diagram showing example components that may be used to provide virtual input event-related data to a UI element of a UI tree based upon virtual input device type, and UI elements' states such as focused, under a pointer or visible or not visible, according to one or more example implementations.

In general, for a button provider, button input is intended to be directed to the UI element with focus. Note that the platform itself typically has no notion of which application program UI element has focus. Instead, as represented in FIG. 4, in one or more implementations, when a user 430 interacts with an input device 432 and thereby a corresponding provider 434, an input manager 436 in conjunction with an input scope 438, each of which may be object instances, track this focus information for an application program. This ensures that any button input is routed to the focused UI element, e.g., element F (labeled 446) in the UI view tree 440. Similarly, the input manager 436 and/or input scope 438 may track which UI element is under the pointer (e.g., UI element H in the UI view tree 440) and which UI element or elements of the UI view tree 440 are currently visible, e.g., those in the dashed box 442.

Figure 5:
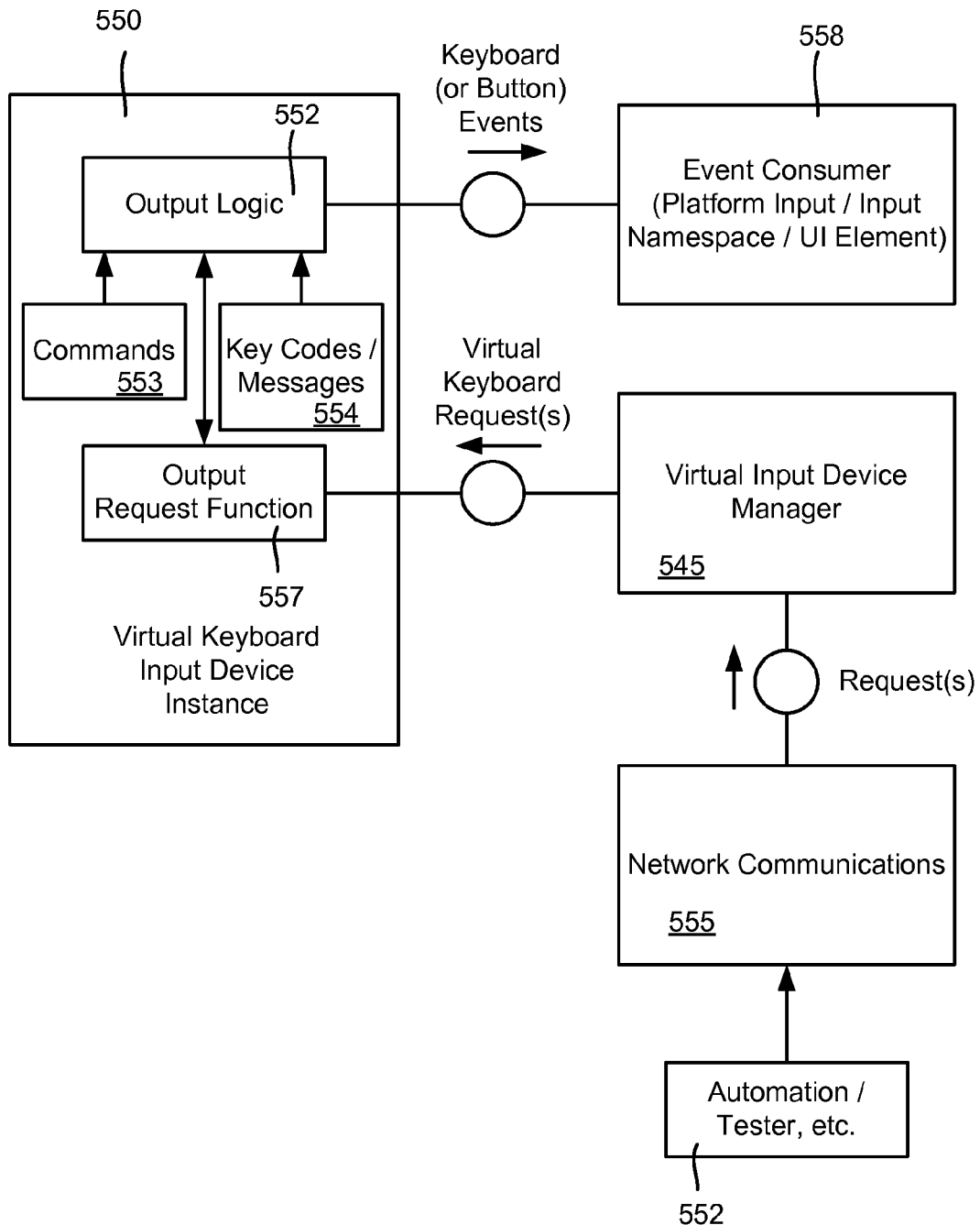
FIGS. 5-7 are block diagrams showing example object instances used as a virtual keyboard device (FIG. 5), a virtual mouse device (FIG. 6) or a virtual command device (FIG. 7), according to one or more example implementations.
Figure 6:
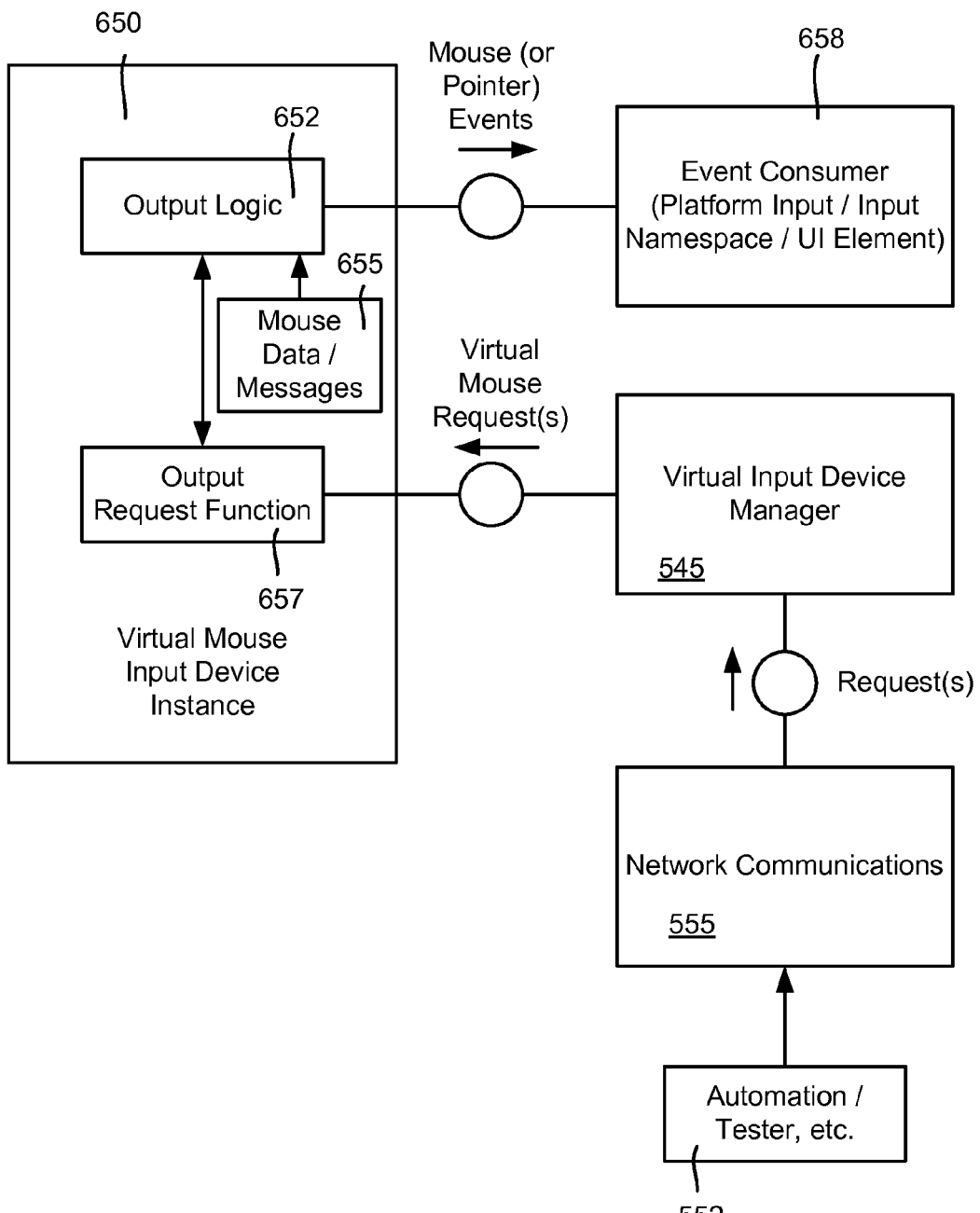
Figure 7:
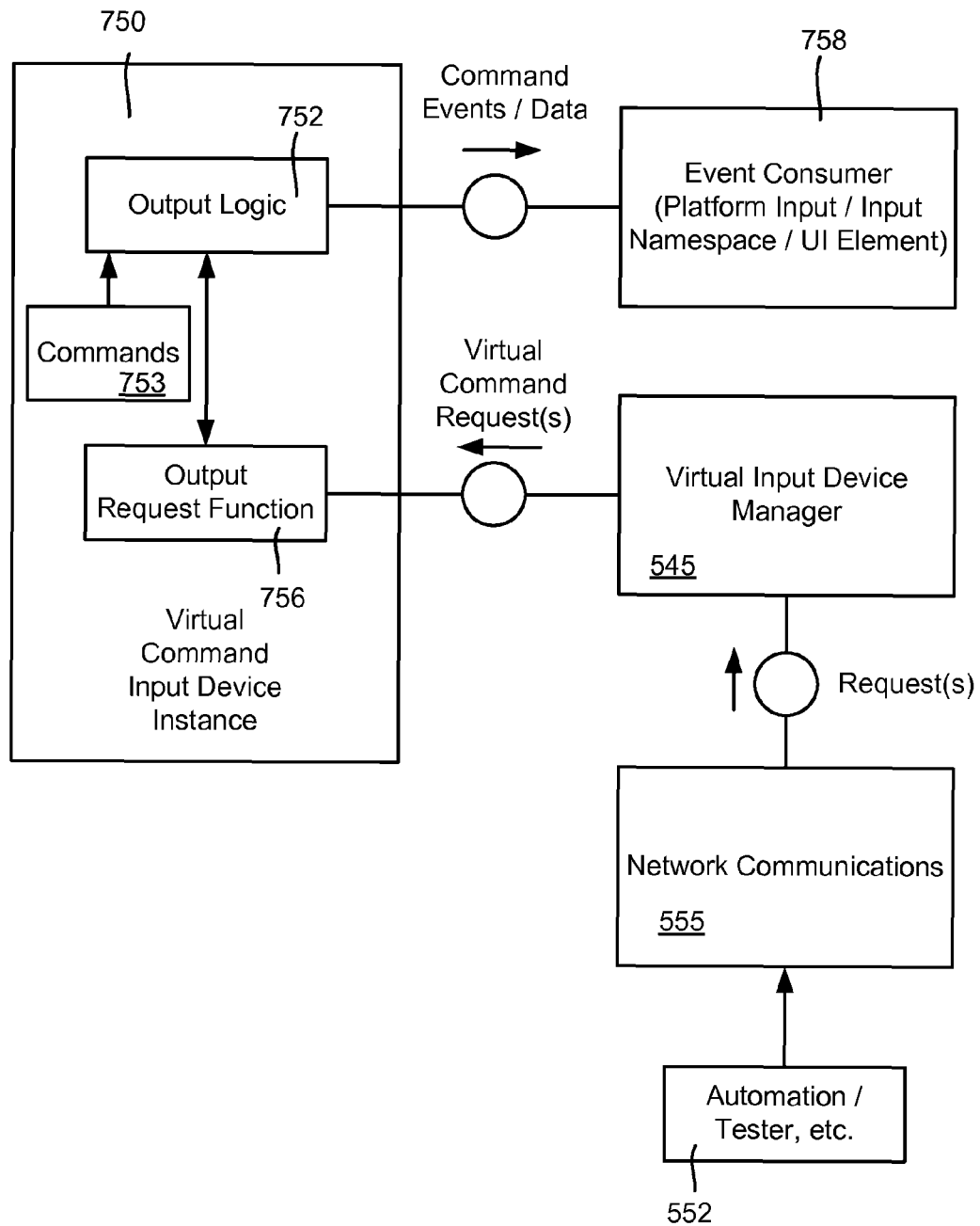

FIGS. 5-7 are example block diagrams representing how object instances may be used to provide virtual input devices for an example virtual keyboard device, virtual mouse device and virtual command device, respectively. Thus, in these examples, the virtual keyboard device, virtual mouse device and virtual command device are object instances, virtual keyboard device object instance 550 (FIG. 5), virtual mouse device object instance 650 (FIG. 6), and virtual command device object instance 750 (FIG. 7). Output logic 552 (FIG. 5), 652 (FIG. 5) and 752 (FIG. 7) in each object instance determines the appropriate event output for the event consumer, which as exemplified in FIG. 1 may be the platform input 104, input namespace component 106, a provider (e.g., 108-110) or a UI element directly, depending on a given implementation and, for example, the purpose of a test. Such consumers are represented in FIGS. 5, 6 and 7 as event consumers 558, 658 and 758, respectively. Note that in an implementation in which a virtual device object is configured to communicate with a UI element directly, the virtual device object may include the normalization functionality of a provider so that the UI element receives the simulated event data as expected.

As represented in the examples of FIGS. 5, 6 and 7, each object instance 550, 650 and 750 has an output request function 557, 657 and 757 that is called to simulate the output of an actual input device event. In general, in any suitable way, automation and/or an actual person (e.g., a tester) may send network (and/or possibly local) requests that simulate user interaction with an actual input device.

By way of example, automation and/or an actual person may make network communication requests that are handled by a network communications object 555 or the like. These requests are directed by a virtual input device manager object instance 545 to the appropriate virtual input device object instance based on some identifying information accompanying the request. Note that the functionality of the virtual input device manager object instance 545 may be built into the network communications object 555, or the network communications object 555 may host such a virtual input device manager object.

The test data or the like may be as simple or as close to actual data as desired in a given implementation. For example, for keyboard input, the actual KEYDOWN and KEYUP data messages may be logged (or automatically generated) and passed through the virtual keyboard input device instance generally as is, and similarly with mouse messages for a virtual mouse input device instance.

However, the virtual device instances alternatively (or in addition to passing message data) may maintain codes and message data (e.g., 554, FIG. 5) that allows the virtual input device to basically translate requests to appropriately simulated device data. For example, a test may simply specify something like "type ABCD," which the virtual input manager knows to call the request function of the virtual keyboard input device instance 550, which in turn accesses codes/message data 555 to produce KEYDOWN and KEYUP data messages for each character. Similarly, a request such as "move the mouse pointer to location (X, Y)" may result in a function call to the virtual mouse input device instance 650, which accesses the mouse data/messages 655 to simulate in order to do so. Note that simulated pointer movement may be gradual, e.g. the pointer may be moved to intermediate positions by the mouse virtual input device before reaching the X, Y location rather than jumping to the location directly; (the test data may do so directly, or request that some intermediate movements be computed and simulated by the virtual input device). A command request such as "Xbox Play" instead calls a function of the virtual command input device instance 750 that is simulating a voice input/recognition device via its command data 755; note that a virtual keyboard input device also may simulate commands, e.g., via a set of commands 553 mapped to certain keys.

Having such mechanisms built into the objects may make for more complex objects, but the amount of data transmitted over the network may be reduced, and further, different types of generally the same type of virtual input device instances (but possibly with subtle differences) may be used with the same test data. For example, one type of pointer device may output message data slightly differently from that of another pointer device, yet the same test command "move the mouse pointer to location (X, Y)" may be used with different types of virtual pointer input devices to simulate the appropriate messages that cause the same pointer movement.

As is readily apparent, in some implementations the device to simulate may be inherent based upon the type of input data that is requested to be simulated, e.g., type "ABCD" is clearly a request to invoked a virtual keyboard input device. However, if there is possibly conflicting request data, e.g., "type ABCD" is requested when there is an instantiated physical keyboard input device instance and instantiated touch-screen keyboard input device instance, the test may specify which to use, e.g., e.g., "type ABCD touch-screen." If not specified, some default override may be used, e.g., use the virtual keyboard device over the virtual touch-screen device if not specified.

As can be readily appreciated, such simple requests (e.g., manually provided by a tester) may be translated to the actual events/message data at any suitable time. This may occur within the virtual device objects as described herein, or may occur in an external, possibly offline process that is then saved as a named test to be run, for example. As is understood, the overall virtual input device system is entirely flexible and many different variations may be implemented.

Figure 8:
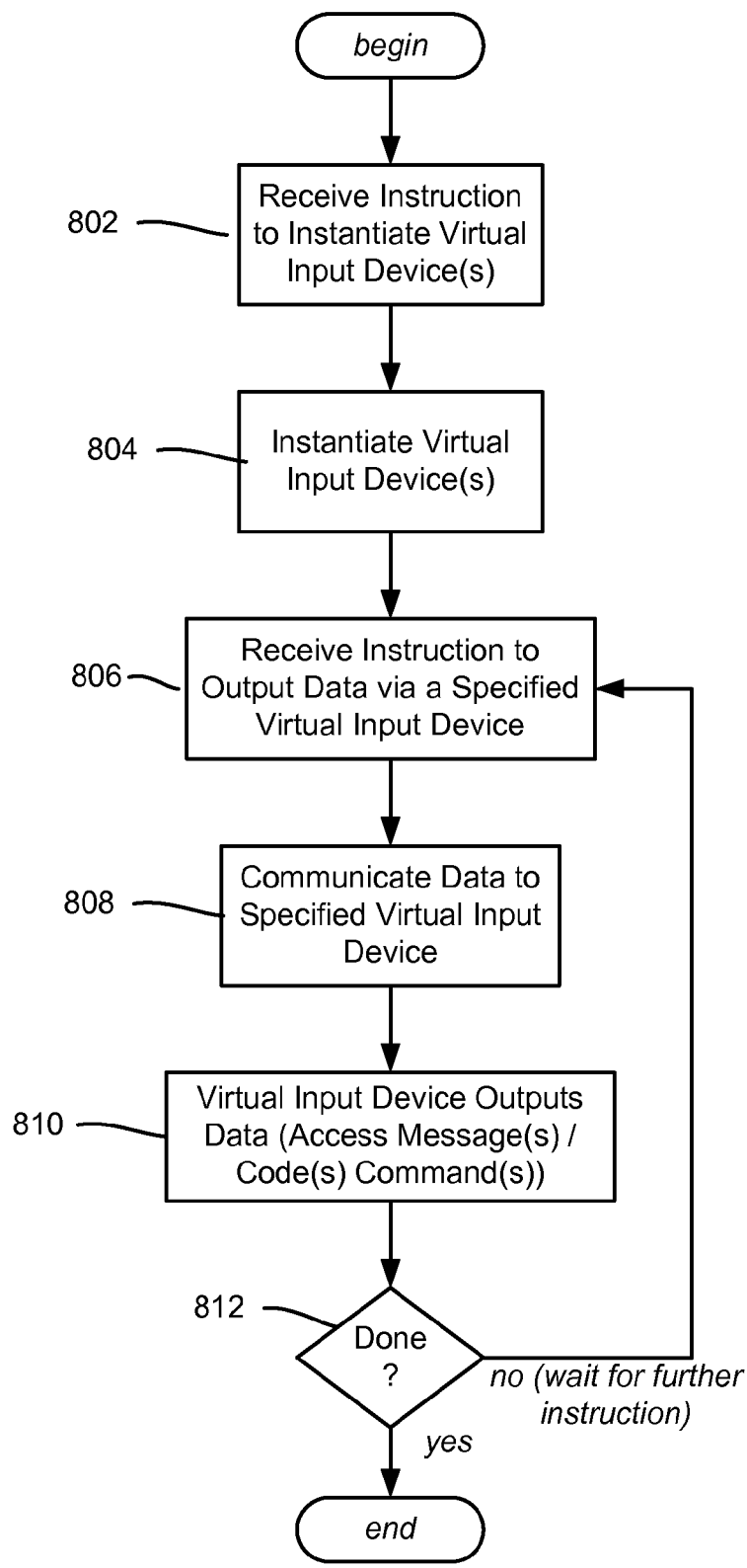
FIG. 8 is a flow diagram showing example steps that may be taken to set up and use virtual input devices, according to one or more example implementations.

FIG. 8 is directed towards setting up a computing machine to use one or more virtual input devices, and then using them, beginning at step 802 where the application program (e.g., a virtual input device manager thereof or possibly a system component) receives an instruction to instantiate one or more virtual input devices, e.g., over the network from an automation component. Step 804 instantiates the requested device(s).

Step 806 represents receiving an instruction to simulate input via a specified virtual input device, which is communicated to the specified virtual input device (e.g., via an object method call) at step 808, resulting in the appropriate data being output at step 810. Step 810 includes any access of the message data (e.g., KEYUP), code data (e.g., the ASCII or Unicode value), and/or command data that may be needed to have the event data output in the appropriate format. The process repeats via step 812 whenever new data needs to be output, until the process (e.g., test) is done. The virtual input devices may be de-instantiated if no longer needed and the application program continues to run.

With respect to input corresponding to the command provider, command input is intended to be directed towards something on the screen, but not via focus or hit testing in one or more implementations. Command execution is a guided process that may contain a number of phases. Phases include waiting, in which the initial phase is waiting for the user to initiate commanding, and initiation.

The output of initiation comprises a list of command targets that has been filtered based on the known information (how the process of initiation began and/or the command). Note that at the time of initiation, a command may or may not yet be available.

By way of some examples, commanding can be initiated in various ways. For example, a user may say "Xbox" whereby there is no command available, or say "Xbox play" whereby a command is available, namely 'Play'. (Note that the "®" symbol was not included in the Xbox®-related commands above, because a user does not refer to such a symbol when speaking such commands.)

Another way that a command may be initiated is when the user presses and/or holds 'Ctrl' or 'Alt' on the keyboard. When such a button is pressed alone there is no command available; however, if a user presses 'Ctrl+S' such as to initiate a 'Save' command, there is a command available. Another command may occur via some direct interaction, e.g., if a user presses 'Play' on a media remote control device, the 'Play' command is directly available.

When initialization does not contain a command, (e.g., saying "Xbox" versus pressing 'Play'), the command provider goes into a targeting phase; (otherwise, this targeting phase is skipped). In the targeting phase, the user ordinarily sees some form of visualization that indicates which commands are available to execute. For example, when a user says "Xbox", movie tiles may go into a command target visual state in which their title is highlighted. This indicates to the user that the user can then speak a particular movie title (or show title) to execute that particular tile activation command. Another example is when a user presses 'Alt' in Microsoft® Word, and the ribbon shows tool tips, e.g., to indicate to the user that further hitting '5' will save the file.

Once the user specifies a command, the command target list is filtered. If the list length is greater than one, that is, more than one UI element still applies to the command, the process goes to disambiguation (described below). If instead the list length equals one, that is, one command applies, the process goes to execution (to execute the command, that is, In Execution, once a single command target has been identified, it is executed, and the process returns to the waiting phase). If the list length is zero, the process stays in targeting. At some point the targeting phase may be canceled, e.g., either explicitly (such as 'Esc' or 'cancel') or implicitly (via a time timeout).

When multiple command targets match the same command, the process enters the disambiguation phase. In this phase, the user ordinarily sees an alternative, non-ambiguous 'phrase' (on the ambiguous items) such as '1', '2', and so forth. Disambiguation acts similarly to targeting in other respects.

With respect to different types of input and providers, the following are only some non-limiting examples, and not all need be used in a given implementation. Keyboard input generally corresponds to the button provider, that is, most keyboard keys are exposed as button input. However some keyboard keys may correspond to the command provider, e.g., play, pause, mute and print screen are non-limiting examples of keyboard keys that may be exposed as commands.

Gamepad input generally corresponds to the button provider, and typically both digital and analog buttons/triggers are exposed as button input. Other button provider devices include Rockband® Guitar input and the like.

Mouse input, stylus input, touch input, Playstation® Move input and Playstation® Eye input are examples of input devices that generally correspond to the pointer provider. Voice input and media remote input generally correspond to the command provider.

Figure 9:
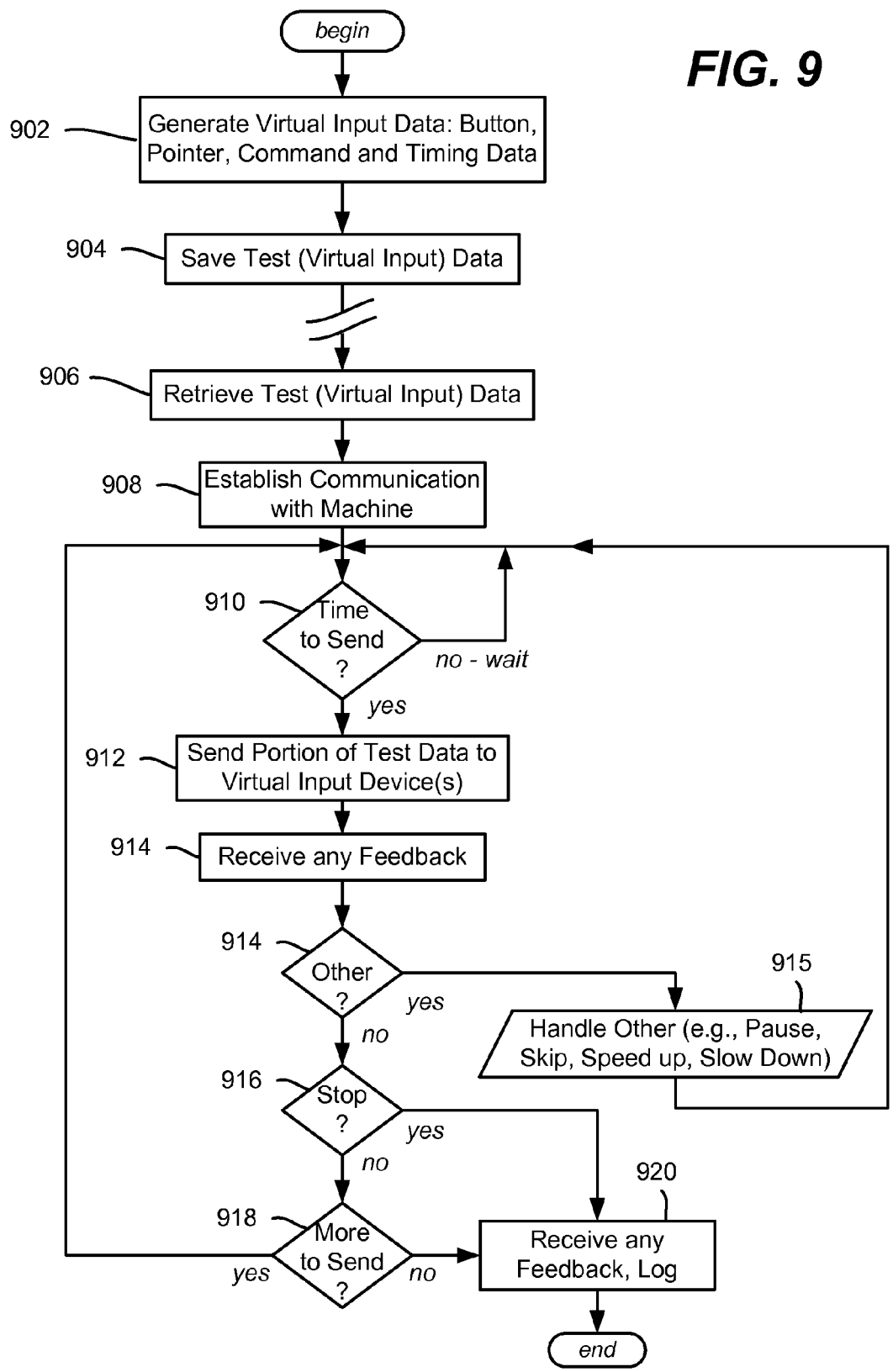
FIG. 9 is a flow diagram showing examples steps that may be taken to test an application program via virtual input devices, according to one or more example implementations.

FIG. 9 is a flow diagram summarizing some example steps related to automation via virtual input devices, beginning at step 902 where input is generated. Input may be computer-generated or manually generated, or a combination of both. For example a tester debugging a program issue may manually compose certain combinations of keystrokes, pointer events and/or commands looking for a problem; the tester may use actual input devices to generate the test data. The tester also (or only) may want some long strings generated by the computer, random characters and commands and so forth.

One of the pieces of information that the tester may want to use in testing is timing data. For example, a tester may want to select a UI element to test how that element is animating its child UI elements over a number of rendering frames. This is only possible if the UI element is given time to complete its animation, e.g., a test that selects UI element A and then selects UI element B cannot test element A's animation if a virtual device mouse click that selects A is followed very quickly by a virtual device mouse click that selects B. Indeed, testing may be directed towards operating as a typical user would do, rather than, for example, inputting data faster than a user could ever do.

Step 904 saves the test data, if desired, e.g., in a persistent data store. The test may now be performed at any desired time, including right after generation, or even during generation of additional test data.

Step 906 represents retrieving the virtual input/test data, and step 908 represents establishing communication with the machine, e.g., over a network such as a local network or the internet. As can be readily appreciated, the communication may be established at any suitable time before the test begins, e.g., before step 906.

Step 910 evaluates whether it is time to send at least part of the test data to the virtual input device or devices. As is understood, testing may be based on loading such virtual input device or devices, cooperation from a user to log into some service or other resource, and so on.

At some time, the computing machine under test is ready, and step 912 sends at least a portion of the test data to the virtual input device or devices. This may be in the form of instructions, e.g., focus element X and type "ABCD" in four separate keystrokes; the instructions may include timing information, e.g., wait 0.25 seconds between the keystrokes.

Step 914 represents receiving any feedback related to the test. For example, the tester may be able to remotely view what the device under test is showing (or would show) on its display. The tester may receive other feedback, e.g., program crashed, program jumped to an unexpected error message and so on. Manual feedback is also possible, e.g., a tester may be on the phone with a user troubleshooting a problem, and the user may verbally describe what happened.

Steps 914-916 are directed towards the tester (or other entity such as a test program) controlling the test, e.g., interrupting, modifying or stopping the test. For example, a tester may want to pause automation to check something before continuing, or pause to let a user take some action before resuming the test. The rate of sending test data/instructions to the virtual input devices may be increased or decreased, or certain parts of a larger test may be skipped. Step 915 represents such a modification, whether automated and/or manual, while step 916 represents stopping the test, e.g., if the program crashed or the tester has found a bug.

Step 918 continues the test as long as more test data/instructions are available to send to the virtual input device or devices. When the test completes, either by being stopped via step 916 or when the test data has been sent, step 920 represents receiving any final feedback, and optionally logging the feedback data. This may, for example, be anything from a large data dump that may be analyzed to look for problems, or an "OK" result indicating that the particular platform and application program passed this test.

It should be noted that in addition to testing, virtual input devices may be used for other purposes. For example, a helpdesk call may occur, and via virtual input devices a helpdesk troubleshooter may be able to step through a user's input actions and determine what a user is doing wrong (or if a bug exists that the user has triggered). Similarly, a user may be shown a demonstration or other teaching aid that walks the user through various input actions by simulating the correct actions via virtual input devices.

Moreover, help may be automated to a large extent via virtual input devices. For example, a user may know what he or she wants (e.g., set up an auto-reply email message with certain text), but does not know how to go through the series of menus and menu selections to do so. Instead of providing a textual and/or graphic help explanation, an automated process may use virtual input devices to walk through the menus and make the correct selections, only needing the message text from the user.

Turning to how the virtual input devices interact with providers and UI elements, button events include 'Down' in which the event is fired by a virtual input devices to simulate when a button is pressed down. For analog buttons, Down is raised when the value transitions above some threshold (e.g., 0.9). Event arguments contain the abstract button code (e.g., in ASCII or Unicode, for example). A button 'Up' event is raised when a pressed button is released, as simulated by virtual input device. For analog buttons, Up is raised when the value transitions below some threshold (e.g., 0.1). Event arguments contain the abstract button code.

A button 'Change' event is raised when a button's value changes. For digital buttons, this happens before and after Down or Up, with value changes between 0 (up) to 1 (down). For analog buttons, this happens each time the analog value changes, between 0 (all the way up–not pressed) to 1 (all the way down). Event arguments contain the abstract button code and value for change button events.

Figure 10:
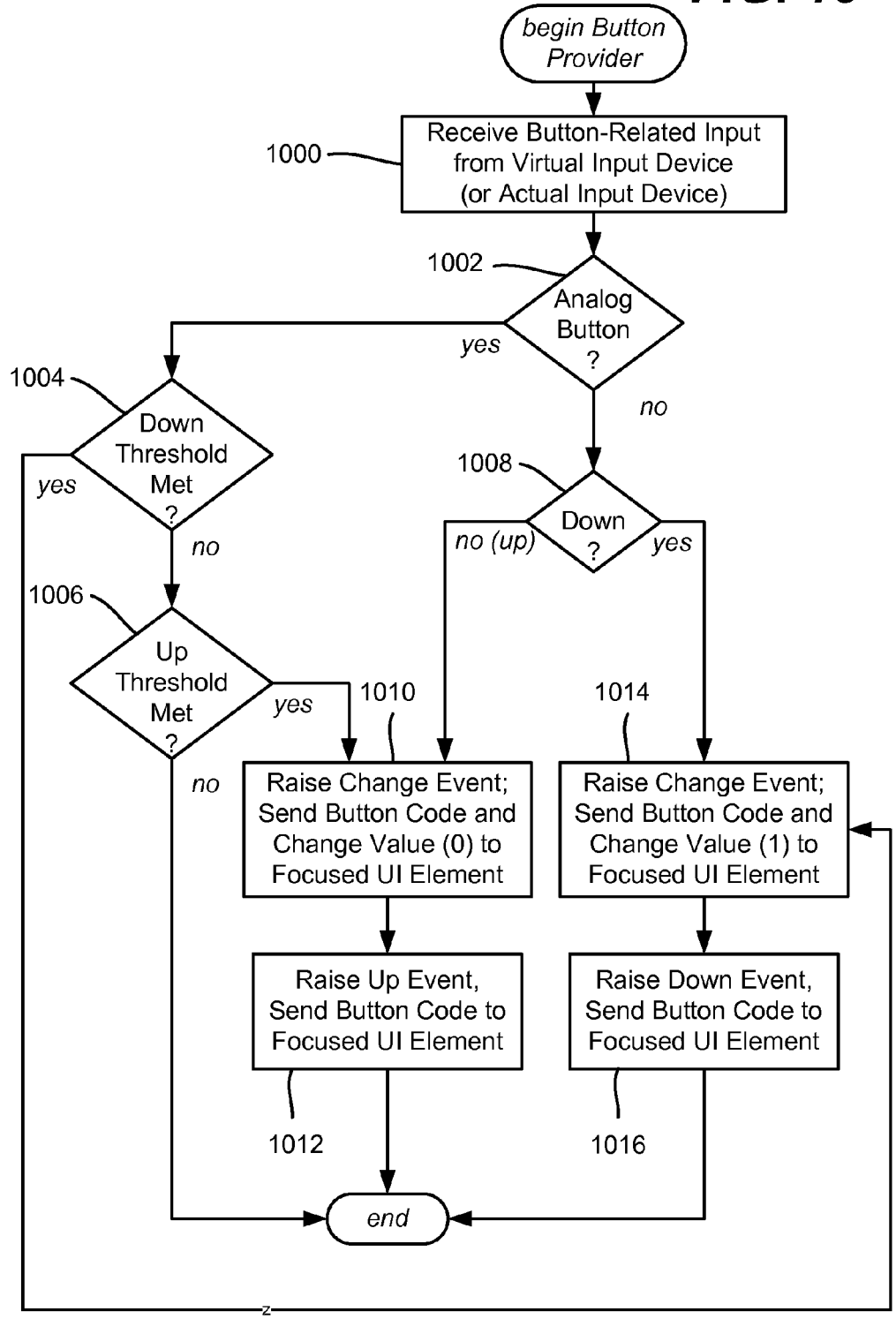
FIG. 10 is a flow diagram showing example steps that may be taken by a button provider to provide button event information to a focused UI element, according to one or more example implementations.

FIG. 10 shows example steps that may be taken when virtual device input data (or actual device input data) is received by a button provider at step 1000. At step 1002 where a distinction is made between analog button events and non-analog (binary up/down) buttons. Analog buttons are considered down based upon a down threshold evaluation (step 1004) or up based upon an up threshold evaluation (step 1006). If considered up, step 1010 is executed, or if down, step 1014 is executed, otherwise the button is not considered invoked. An application program may choose its own analog threshold values based upon data in the button provider or accessed by the button provider; such threshold values may vary during the running of the application program code, e.g., a game in one state may have relatively insensitive threshold values (e.g. down is above 0.9, up is below 0.1), and in another state may have relatively sensitive threshold values (e.g. down is above 0.6, up is below 0.4). Moreover, the threshold values may differ for different types of buttons.

For a binary button, step 1008 evaluates whether the button is a down button and if so, branches to step 1014. Otherwise the button is an up button event, handled via step 1010. In general and as described above, change events are fired (to the focused UI element.) based upon the up event (step 1010) or down event (step 1014), followed by the button up event (step 1012) or button down event (step 1016), respectively.

For the pointer provider, pointer input including from a pointer virtual input device is intended to be directed to the UI element 'under' the pointer (via hit-testing). Again, the platform itself typically has no notion of UI elements and/or hit testing, except, for example, when platform-based scrolling is being used.

Pointer input events include 'Engage' which is when a pointer becomes available/engaged (e.g., becomes active as an input device). Note that not all devices have the concept of Engage (enter)/or Disengage (exit), e.g., a virtual mouse device and virtual touch input device do not, whereas a virtual stylus input device and virtual "Kinect®" input device o have Engaged and Disengaged states. A pointer input 'Disengage' event is when a pointer becomes unavailable/disengaged. Pointer Engage and Disengage input event arguments contain at least a pointer identifier (ID).

Pointer input events also include 'Down' which is when a pointer is in a simulated (or actual) "pressed" state or the like. For a Down event, the event arguments contain at least a pointer ID and location.

Another Pointer input event is 'Move' which is fired when a pointer is moved. Note that some devices can have a Move event before a Down, which is a 'hover move' event. Event arguments contain at least a pointer ID and location, and typically an isHover flag value.

A pointer input 'Up' event is raised when a (e.g., formerly virtually pressed) pointer is released. Event arguments contain at least a pointer ID and location, and an isCancel flag value.

Figure 11:
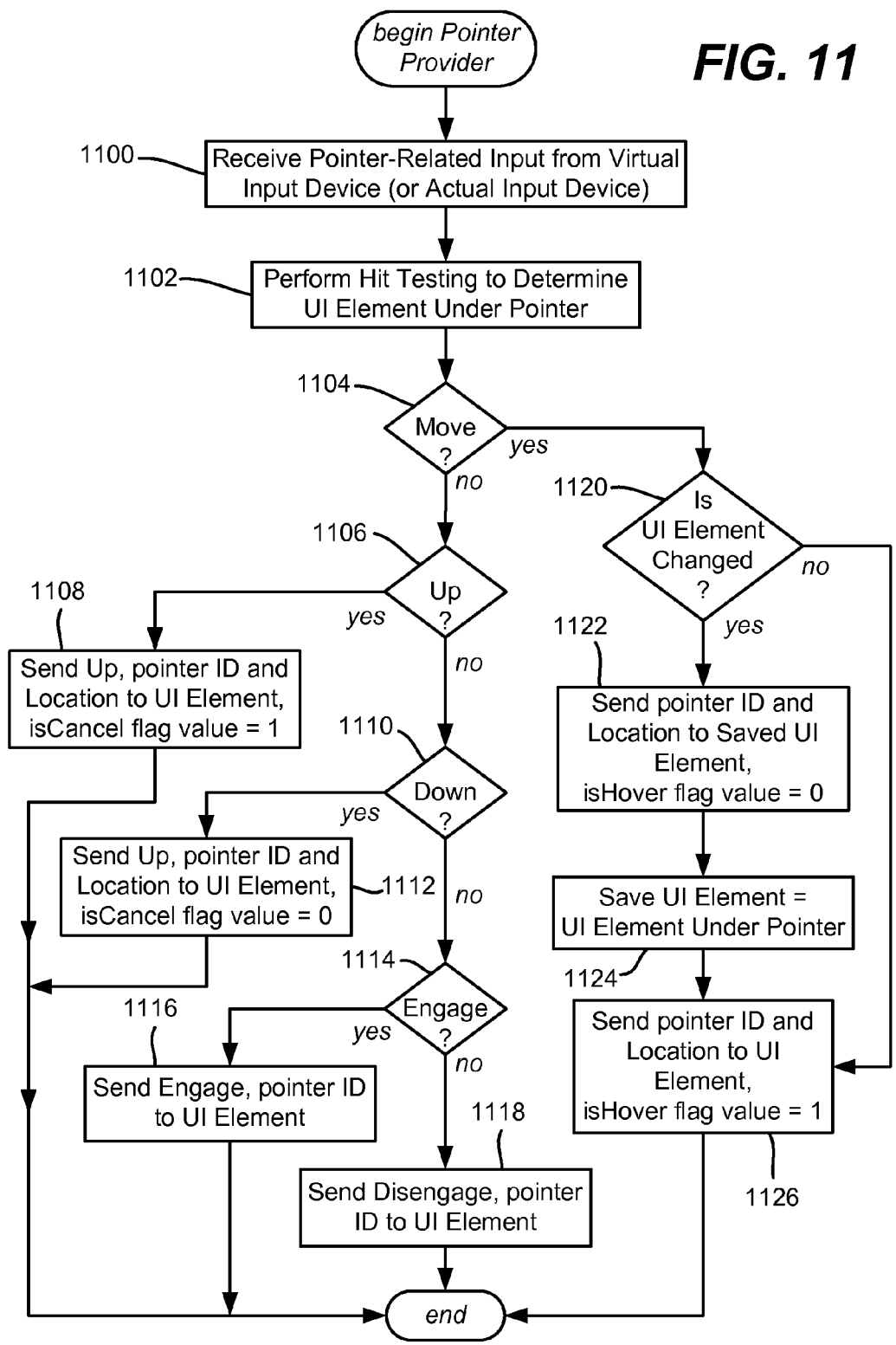
FIG. 11 is a flow diagram showing example steps that may be taken by a pointer provider to provide pointer event information to a UI element located under a pointer, according to one or more example implementations.

FIG. 11 shows example steps that may be taken by a pointer provider, beginning at steps 1100 and 1102 where hit testing is performed (step 1102) based upon a virtual (or actual) pointer event received at the pointer provider (step 1100). Note that hit testing may be performed elsewhere in the system, e.g., by the input manager and input scope, in which event step 1102 accesses the hit testing information. In any event, the pointer provider knows the location of the pointer and what occurred, e.g., a move, up, down, engage or disengage event. Note that FIG. 11 only exemplifies these five states for purposes of illustrating one example implementation; other implementations may have other events, e.g., right mouse button down, right mouse button up, left mouse button down or left mouse button up may be separately handled in a straightforward way. Moreover, as is understood, the order of evaluating these events is arbitrary (although if an actual ordering is used, more frequent events such as move may be evaluated first, for example, for efficiency).

Step 1104 evaluates whether the pointer event is a Move event, and if not, step 1106 evaluates whether the pointer event is an Up event. If so, step 1108 sends the Up event along with the pointer ID, location and, for example, the isCancel flag value of 1 to the UI Element under the pointer. Note that in general UI elements are rendered in Z-order with children rendered above their parent which is rendered above the parent's parent and so on, and thus as with hit testing, the targeted UI element is the lowest child having its area under the pointer; there is generally always at least some UI element in the application program's viewing area to receive the event. The UI element's invoke may take action with respect to the Up event, e.g., change focus to the invoked element, select an item for playback, select an item for text entry, and so on.

If not an up event, a Down event is evaluated at step 1110 and handled at step 1112, which for example sends the Down event along with the pointer ID, location and, for example, the isCancel flag value of 0 to the UI Element under the pointer. The UI element's invoke may take action with respect to the Down event, e.g., allow dragging of a UI element while holding the pointer down. There may not be an action taken, e.g., a UI element may need a Down event followed by an Up event to take an invoke action.

If neither a Move, Up or Down event, then in this example the event is either an engage event (steps 1114 and 1116) or a disengage event (step 1118), which each send their respective event and the pointer ID to the UI element under the pointer.

Returning to step 1104, pointer devices may move the pointer without the pointer being up or down, e.g., a virtual mouse input device may move the pointer around the application program's visible area, in which event the pointer hovers over some UI element of that application program. Step 1104 detects this move event, and step 1120 determines if the move event changed the UI element underneath the pointer. If not, then nothing need be changed, although step 1126 may be executed to inform the UI element of the new pointer location, so that, for example, the UI element may change itself in some way, (e.g., the element may change its appearance one way if hovering near the center of the UI element versus a different appearance if hovering away from the center of the UI element).

If the Move event changes the underlying UI element, step 1122 sends the pointer ID and (optionally) the location to the previously hovered UI element (its identity was saved during the last Move event) along with the isHover flag value=0 so that the previously hovered UI element knows that it is no longer underneath the pointer, e.g., so it can change its appearance in some way if desired to indicate the non-hovered state. Step 1124 changes the saved UI element ID to that of the newly hovered UI element, and step 1126 notifies the new UI element of the Move event, the location data and the isHover flag value=1 so that the new UI element knows it is being hovered over. The hovered over UI element may not change its appearance or other characteristics to reflect this state, e.g., a parent menu container may not change its appearance but a child item element of that menu container may change its appearance.

Figure 12:
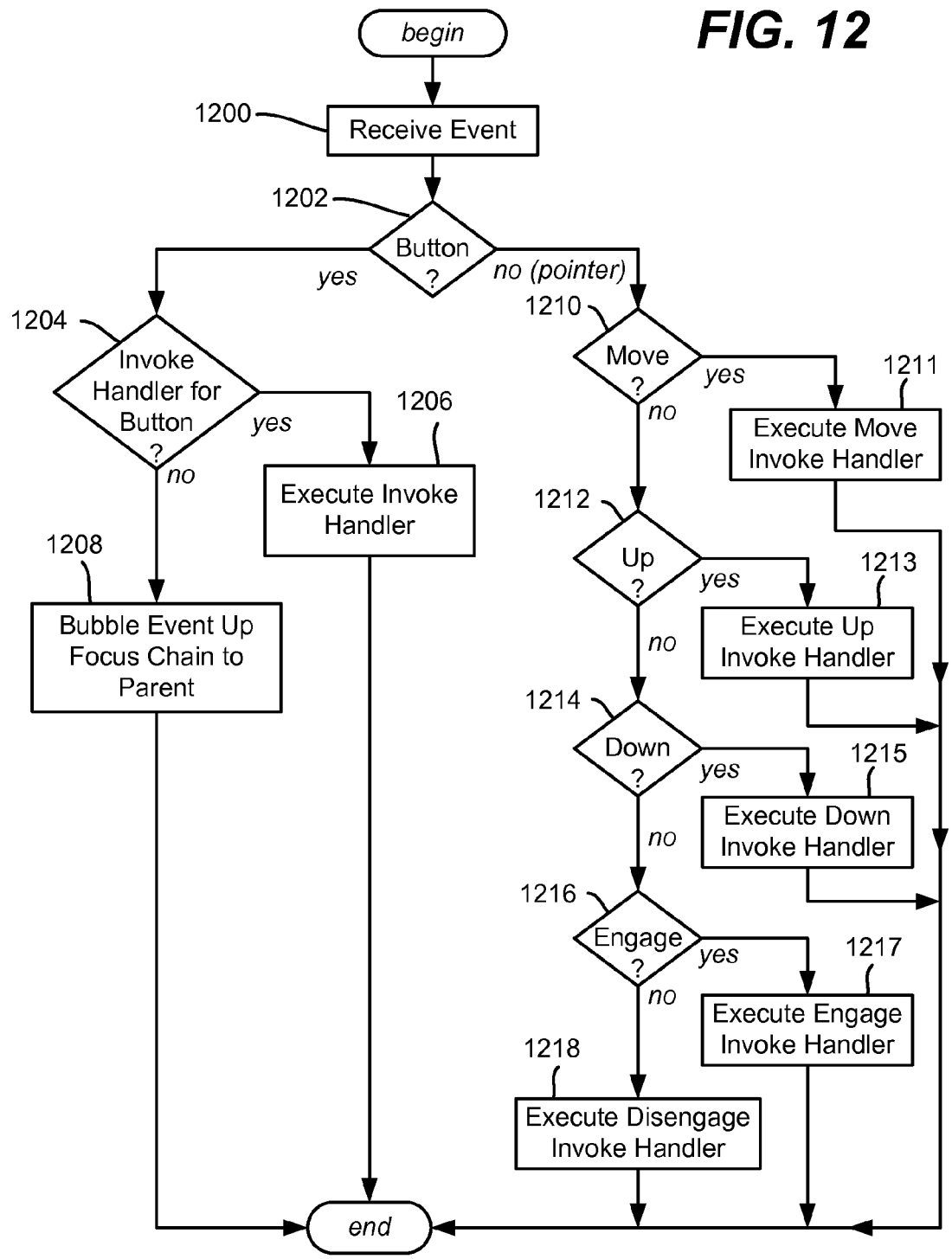
FIG. 12 is a flow diagram showing example steps that may be taken by a UI element to process button or pointer input events, according to one or more example implementations.
Figure 13:
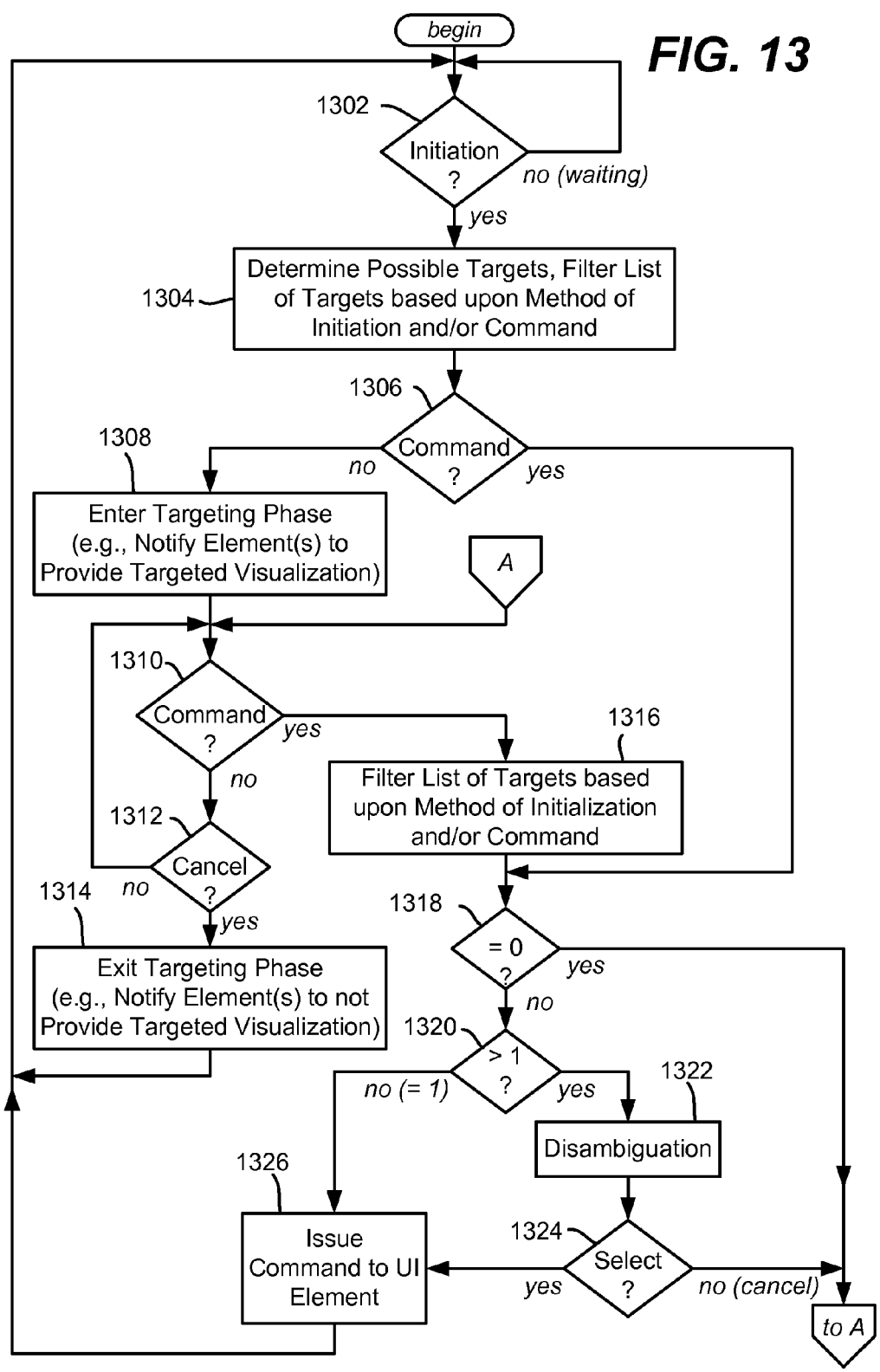
FIG. 13 is a flow diagram showing example steps that may be taken by a command provider to provide command-related data to a selected UI element of a set of one or more UI candidate element or elements, according to one or more example implementations.
Figure 14:
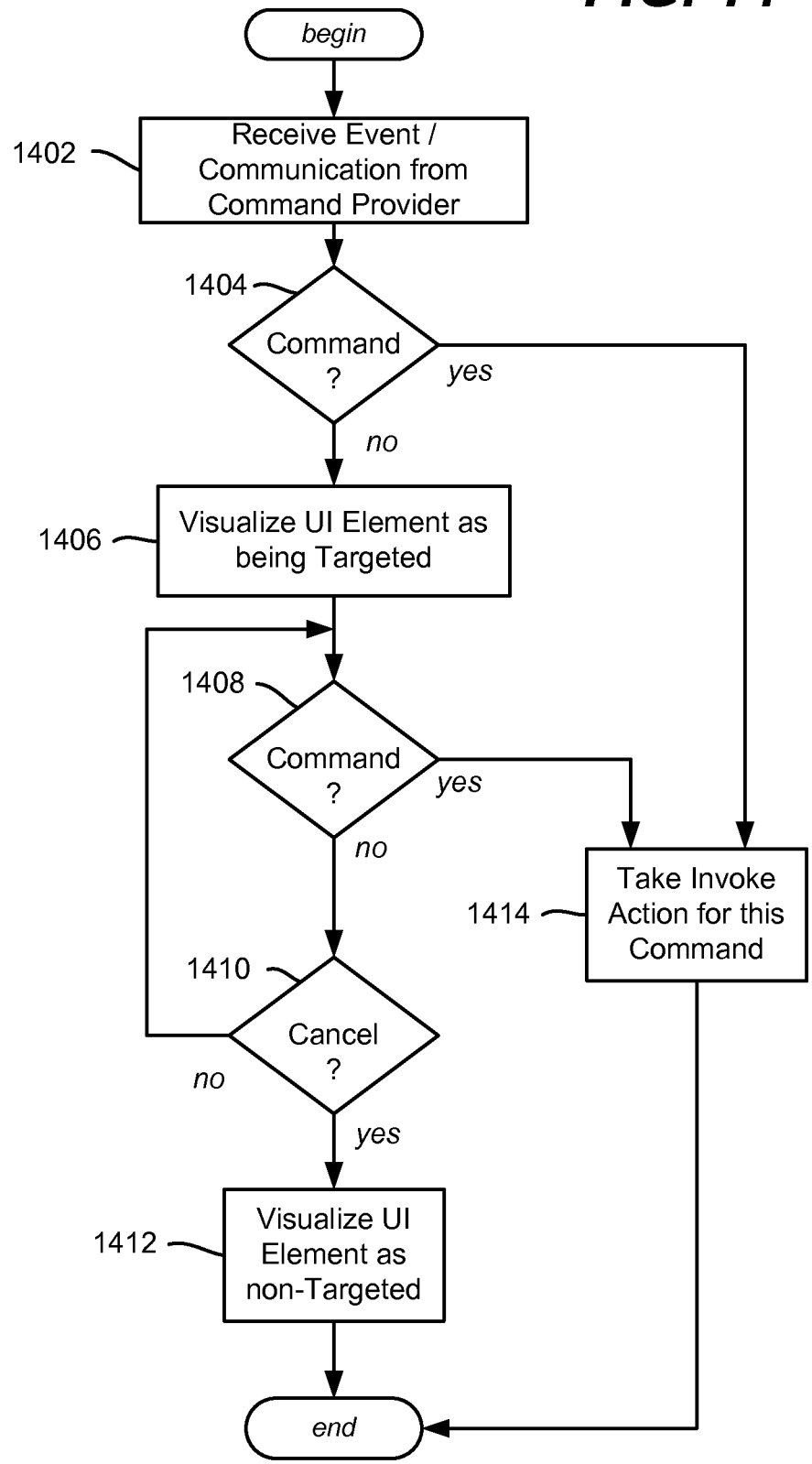
FIG. 14 is a flow diagram showing example steps that may be taken by a UI element to communicate with a command provider and process command-related data, according to one or more example implementations.

FIG. 12 summarizes example steps that may be taken by a UI element upon receiving button or pointer input from a button provider or pointer provider, respectively, as represented by step 1200; (note that FIGS. 13 and 14 are directed towards handling command input, which may be directed towards multiple UI elements). Step 1202 evaluates whether the input is from the button provider, and if so, branches to step 1204 to determine if the UI element has an invoke handler for this button. If so, step 1206 executes the invoke handler to take the invoke action specified therein. If not, the button event is bubbled up the focus chain (e.g., 444, FIG. 4) to the UI element's parent; note that at least the highest level parent may take an invoke action, which may simply be to ignore the button event.

If instead the event is a pointer event, step 1202 branches towards steps 1210-1218. Steps 1210 and 1211 are for handling move events, steps 1212 and 1213 are for handling up events, steps 1214 and 1215 are for handling down events, steps 1216 and 1217 for engage events, and step 1218 for disengage events. Again, the order of handling such events is arbitrary (although it is feasible that the ordering can impact efficiency). As represented in FIG. 12, each such event may have a separate invoke handler; however, as can be readily appreciated, an alternative implementation may have as little as a single invoke handler that internally differentiates among the different types of pointer events to take an appropriate action for each type. Further, although not shown in FIG. 12, it is feasible to have not have a specified pointer event handler for a given pointer event, in which situation the pointer event may bubble up to the parent (similar to non-handled button events).

FIG. 13 summarizes example steps of the command provider, and FIG. 13 example steps of a UI element that receives input (or other communications) from the command provider. Step 1302 represents the waiting phase, until a command virtual input device (or actual user input device) initiates commanding.

Step 1304 determines the set of candidate target UI elements, e.g., those visible on the screen. Note however that new UI elements also may be placed on screen when entering the initiation phase, e.g., if the virtual input device simulates the "Alt" key then the ribbon shows tool tips that were not previously visible. This set may be filtered into a subset of zero, one or more targets based upon the process of entering initiation (e.g., spoken, key press, gesture and so on) and/or based upon any accompanying command. For example, the "Play" command may apply only to one or more currently visible UI elements representing some media that can be played, and not to UI elements such as a parent item container, "Back" button and so forth.

Step 1306 evaluates whether the virtual input device entered the initiation phase with an associated command. If not, at step 1308 the command provider enters the targeting phase. In the targeting phase, the user (e.g., the tester) ordinarily sees some form of targeting-related visualization that indicates which commands/UI elements are available to receive a command to execute. Thus, step 1308 provides the UI elements with an opportunity to render themselves in a certain way; e.g., movie tiles may go into a command target visual state in which their title is highlighted. Step 1310 then represents waiting for a command in the targeting phase; if received, the command target list (again, for example) may be filtered at step 1316 based upon the received command.

At some point the targeting phase instead may be canceled, e.g., either explicitly (such as 'Esc' or 'cancel') or implicitly (via a time timeout). This is represented via step 1312. If canceled, the UI elements that were targeted may be notified to no longer provide the targeting-related visualization that indicated that those elements are element(s) targeted for a command.

If the command target list length is greater than zero as evaluated at step 1318, the process stays in targeting. If instead the list has more than one UI element that still applies to the command, as evaluated at step 1320, the process goes to disambiguation at step 1322, e.g. to select (step 1324) a single UI element for the command; this may include notifying any UI elements subject to disambiguation to change their appearance or the like. Note that the virtual input device may choose to not select an element during disambiguation, (e.g., the tester cancels or the disambiguation phase times out), in which event the process may return to the targeting phase, or alternatively, to the waiting phase, possibly notifying any relevant UI elements to change their appearance or the like.

If instead the list length equals one, that is, the command applies to one UI element, the process goes to execution at step 1326, e.g., the command is sent to the UI element for its command invoke handler to handle via an invoke action.

FIG. 14 shows example steps related to a UI element's interaction with the command provider, beginning at step 1402 where the command event or some other related communication is received. If the communication is a command event, the UI element invokes an action related to the command at step 1414; (again, possibly bubbling up the command if no invoke handler relates to this command).

If not a command, the communication may be to notify the UI element that the UI element is part of the targeting phase of the command provider, whereby at step 1406 the UI element may visualize itself in some new way to indicate it is being targeted. Once targeted, the UI element waits for a command event or a cancel communication. If a command is received, the UI element process branches to step 1414 to handle the command as described herein, e.g., via a suitable invoke handler. Alternatively, the communication may be a cancel, whereby the UI element may visualize itself in some other way to indicate it is no longer being targeted.

As can be seen, the technology described herein provides for abstracting input away from platform-specific input devices to allow automation or remote control of input to run on any platform. To this end, virtual input devices simulate actual input devices to provide remote and/or automated input to an input system of a platform and application program.

One or more aspects are directed towards receiving a request to output an event at a virtual input device, and outputting data directed to a computer program from the virtual input device to simulate the event being output from an actual input device. Outputting the data may include routing the data to a provider of a set of two or more providers to normalize the data into a normalized event that is received by a UI element of the computer program that is configured to handle normalized events. Routing the data to the provider may include routing the data to a button provider, routing the data to a pointer provider or routing the data to a command provider.

The virtual input device may be an instantiated object instance, and the request to output the event at the virtual input device may be received function call on a function of the virtual input device object instance.

Receiving the request to output the event at the virtual input device may comprise receiving a network communication corresponding to the request. Receiving the request to output the event at the virtual input device may comprise receiving test data, including at least one part of the test data that corresponds to the request.

The request may be translated into one or more messages and one or more codes to simulate the event being output from an actual input device.

One or more aspects are directed towards a request receiving entity that is configured to obtain requests from a request generating entity or entities, in which the requests correspond to data capable of being output by interaction with a user input device. A virtual input device object instance is coupled to the request receiving entity, including to receive function calls from the request receiving entity. The virtual input device object instance includes a function that when called with an output request, outputs event data to an event consumer, wherein the event data comprises one or more messages, one or more codes, and/or one or more commands. Each event is formatted to simulate data capable of being output by interaction with a user input device.

The virtual input device object instance may comprise a keyboard virtual input device object instance or a game controller virtual input device object instance. The virtual input device object may be coupled to a button provider that normalizes event data from the keyboard virtual input device object instance or game controller virtual input device object instance into button events.

The virtual input device object instance may comprise a mouse virtual input device object instance, a stylus virtual input device object instance, a pointing device virtual input device object instance, a camera-based pointing device or a touch virtual input device object instance that simulates pointer events. The virtual input device object may be coupled to a pointer provider that normalizes event data from the mouse virtual input device object instance, the stylus virtual input device object instance, the pointing device virtual input device object instance, the camera-based pointing device or the touch virtual input device object into pointer events.

The virtual input device object instance may comprise a voice virtual input device object instance, a media remote virtual input device object instance or a skeletal tracking virtual input device object instance that simulates command events. The virtual input device object may be coupled to a command provider that normalizes event data from the voice virtual input device object instance, the media remote virtual input device object instance or the skeletal tracking virtual input device into command events.

The request receiving entity may include a virtual input device manager that based upon information associated with each request, directs each request to the virtual input device object instance or to at least one other virtual input device object instance.

One or more aspects are directed towards communicating test data towards an application program running on a computing machine or device, and directing the test data to one or more virtual input devices, each virtual input device configured to use any test data received thereby to output event data that simulates one or more events output from an actual input device. Described herein is receiving the event data or normalized data corresponding to the event data at one or more user interface (UI) elements of the application program, and taking invoke actions at the one or more user interface (UI) elements based upon the event data or the normalized data.

The event data may be received at a provider, with the provider normalizing the event data into the normalized data. One or more virtual input device object instances may be instantiated to operate as the one or more virtual input devices.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 15 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 15:
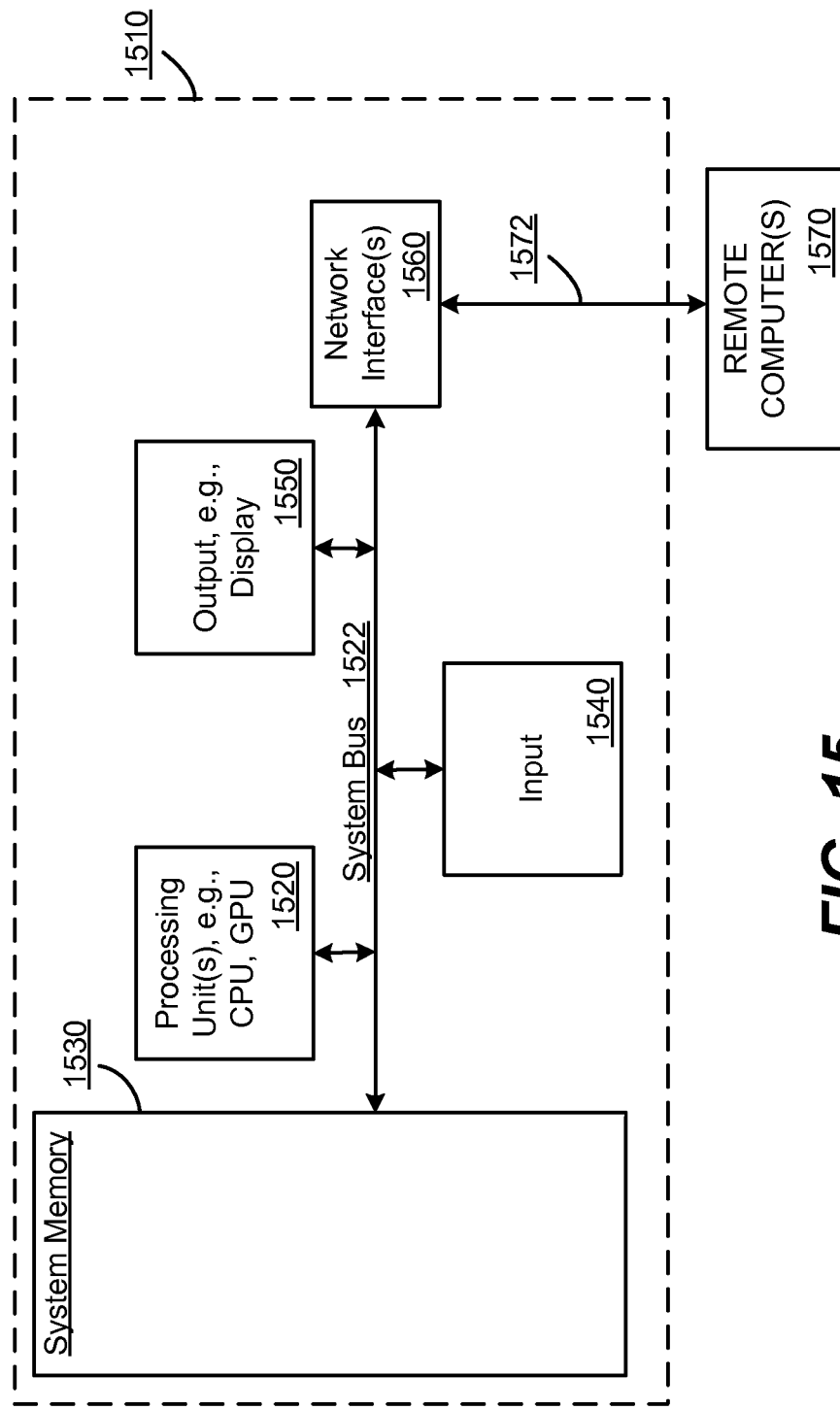
FIG. 15 is a block diagram representing an example computing environment into which aspects of the subject matter described herein may be incorporated.

FIG. 15 thus illustrates an example of a suitable computing system environment 1500 in which one or aspects of the implementations described herein can be implemented, although as made clear above, the computing system environment 1500 is only one example of a suitable computing environment and is not intended to suggest any limitation as to scope of use or functionality. In addition, the computing system environment 1500 is not intended to be interpreted as having any dependency relating to any one or combination of components illustrated in the example computing system environment 1500.

With reference to FIG. 15, an example device for implementing one or more implementations includes a general purpose computing device in the form of a computer 1510. Components of computer 1510 may include, but are not limited to, a processing unit 1520, a system memory 1530, and a system bus 1522 that couples various system components including the system memory to the processing unit 1520.

Computer 1510 typically includes a variety of machine (e.g., computer) readable media and can be any available media that can be accessed by a machine such as the computer 1510. The system memory 1530 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1530 may also include an operating system, application programs, other program modules, and program data.

A user can enter commands and information into the computer 1510 through one or more input devices 1540. A monitor or other type of display device is also connected to the system bus 1522 via an interface, such as output interface 1550. In addition to a monitor, computers can also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   generating, by a processor included on at least one device, a mapping of input devices to providers based on respective types of input data generated by the input devices, wherein the providers normalize the input data generated by the input devices, and wherein the input devices are at least one of actual input devices or virtual input devices;
   receiving, by the processor, a request to output an event at a virtual input device of the virtual input devices, wherein the virtual input device corresponds to a first input device type;
   identifying, by the processor, a provider corresponding to the virtual input device based upon the mapping;
   routing, by the processor to the provider, first input data directed to a computer program from the virtual input device in order for the provider to simulate the event being output from a second input device type supported by a device on which the computer program executes, wherein the device does not support the first input device type;
   normalizing, by the processor via the provider, the input data into a normalized event simulating the event being output from the second input device type, wherein the normalized event is receivable by a user interface element of the computer program that is configured to handle normalized events; and
   outputting, by the processor, the normalized event to the user interface element of the computer program.

2. The method of claim 1, wherein generating the mapping comprises generating a one-to-many mapping for at least one input device to the providers.

3. The method of claim 1, wherein the routing the first input data to the provider comprises routing the first input data to a button provider representative of a button input device type.

4. The method of claim 1, wherein the routing the first input data to the provider comprises routing the first input data to a pointer provider representative of a pointer input device type.

5. The method of claim 1, wherein the routing the first input data to the provider comprises routing the first input to a command provider representative of a command input device type.

6. The method of claim 1, wherein the virtual input device comprises an instantiated object instance, and wherein the receiving the request to output the event at the virtual input device comprises receiving a function call on a function of the virtual input device object instance.

7. The method of claim 1, wherein the receiving the request to output the event at the virtual input device comprises receiving a network communication corresponding to the request.

8. The method of claim 1, further comprising selecting, by the processor, the provider from a plurality of providers mapped to the input device based on a characteristic of the event being output.

9. The method of claim 1, wherein the normalizing the first input data comprises translating the first input data into one or more messages and one or more codes to simulate the event being output from the second input device type.

10. A system comprising:
    a processor; and
    a memory communicatively coupled to the processor, the memory having stored therein computer-executable instructions, comprising:
      an input namespace component configured to generate a mapping of input devices to providers based on respective types of input data generated by the input devices, wherein the providers normalize the input data generated by the input devices, and wherein the input devices are at least one of actual input devices or virtual input devices;
      a request receiving entity configured to obtain a request to output an event at a virtual input device of the virtual input devices, wherein the virtual input device corresponds to a first input device type;
      a virtual input device manager configured to:
        identify a provider corresponding to the virtual input device based upon the mapping, and
        route, to the provider, first input data directed to a computer program from the virtual input device in order for the provider to simulate the event being output from a second input device type supported by a device on which the computer program executes, wherein the device does not support the first input device type; and
      the provider configured to:
        normalize the input data into a normalized event simulating the event being output from the second input device type, wherein the normalized event is receivable by a user interface element of the computer program that is configured to handle normalized events, and
        output the normalized event to the user interface element of the computer program.

11. The system of claim 10, wherein the mapping comprises a one-to-many mapping for at least one input device to the providers.

12. The system of claim 10 wherein the virtual input device manager is further configured to select the provider from a plurality of providers mapped to the input device based on a characteristic of the event being output.

13. The system of claim 10, wherein the providers comprise at least one of a button provider representative of a button input device type, a pointer provider representative of a pointer input device type, or a command provider representative of a command input device type.

14. The system of claim 10, further comprising a helpdesk troubleshooter component configured to automatically identify an error condition associated with information provided during a helpdesk call based on at least the output of the event at the virtual input device.

15. The system of claim 10, wherein the provider normalizes the input data by translation of the first input data into one or more messages and one or more codes to simulate the event being output from the actual input device.

16. A non-transitory computer-readable medium having instructions stored thereon that, in response to execution, cause a system including a processor to perform operations, comprising:
   generating a mapping of input devices to providers based on respective types of input data generated by the input devices, wherein the providers normalize the input data generated by the input devices, and wherein the input devices are at least one of actual input devices or virtual input devices;
   receiving a request to output an event at a virtual input device of the virtual input devices, wherein the virtual input device corresponds to a first input device type;
   identifying a provider corresponding to the virtual input device based upon the mapping;
   routing, to the provider, first input data directed to a computer program from the virtual input device in order for the provider to simulate the event being output from a second input device type supported by a device on which the computer program executes, wherein the device does not support the first input device type;
   normalizing, via the provider, the input data into a normalized event simulating the event being output from the second input device type, wherein the normalized event is receivable by a user interface element of the computer program that is configured to handle normalized events; and
   outputting the normalized event to the user interface element of the computer program.

17. The non-transitory computer-readable medium of claim 16, wherein the mapping comprises a one to many mapping for at least input device to the providers.

18. The non-transitory computer-readable medium of claim 16, the operations further comprising, selecting the provider from a plurality of providers mapped to the input device based on a characteristic of the event being output.

19. The non-transitory computer-readable medium of claim 16, wherein the providers comprise at least one of a button provider representative of a button input device type, a pointer provider representative of a pointer input device type, or a command provider representative of a command input device type.

20. The non-transitory computer-readable medium of claim 16, the operations further comprising automatically identifying an error condition associated with information provided during a helpdesk call based on at least the output of the event at the virtual input device.

\* \* \* \* \*